US008984077B2

(12) United States Patent
Caden et al.

(10) Patent No.: US 8,984,077 B2
(45) Date of Patent: Mar. 17, 2015

(54) FUTURE MESSAGING SYSTEM

(75) Inventors: Jeffrey A. Caden, Seattle, WA (US);
Duncan A. Seay, Tiburon, CA (US);
Chris Halim, San Jose, CA (US)

(73) Assignee: Evergram, Inc., San Francisco, CA (US)

( * ) Notice: Subject to any disclaimer, the term of this patent is extended or adjusted under 35 U.S.C. 154(b) by 135 days.

(21) Appl. No.: 13/594,774

(22) Filed: Aug. 24, 2012

(65) Prior Publication Data

US 2013/0054721 A1    Feb. 28, 2013

Related U.S. Application Data

(60) Provisional application No. 61/575,642, filed on Aug. 24, 2011.

(51) Int. Cl.
*G06F 15/173* (2006.01)
*G06Q 50/00* (2012.01)
*H04L 12/00* (2006.01)

(52) U.S. Cl.
CPC .............. *G06Q 50/00* (2013.01); *H04L 12/00* (2013.01)
USPC .............. 709/206; 709/223; 707/769; 705/28

(58) Field of Classification Search
USPC ................. 709/206, 223; 707/769; 705/28
See application file for complete search history.

(56) References Cited

U.S. PATENT DOCUMENTS

| 7,380,213 | B2 | 5/2008 | Pokorny et al. |
| 2005/0222996 | A1* | 10/2005 | Yalamanchi ............... 707/4 |
| 2009/0198596 | A1* | 8/2009 | Dolan et al. ............... 705/28 |
| 2011/0040863 | A1* | 2/2011 | Griffin et al. ............... 709/223 |
| 2011/0072035 | A1* | 3/2011 | Gaucas et al. ............... 707/769 |
| 2013/0046810 | A1 | 2/2013 | Loew |

FOREIGN PATENT DOCUMENTS

| WO | PCT/US2012/052402 | 8/2012 |
| WO | WO 2013/028526 | 2/2013 |
| WO | WO 2013/029031 | 2/2013 |

OTHER PUBLICATIONS

International Search Report and Written Opinion for PCT/US2012/052402, Dec. 14, 2012 (mailing date), Evergram, Inc.
International Preliminary Report on Patentability for PCT/US2012/052402, Apr. 17, 2014 (mailing date), Evergram, Inc.

(Continued)

*Primary Examiner* — Tammy Nguyen
(74) *Attorney, Agent, or Firm* — Adeli LLP

(57) ABSTRACT

Some embodiments of the invention provide a future messaging system that can be configured to analyze data from one or more data sources in an automated manner in order to detect with a degree of accuracy the occurrence of a possible future event, which may or may not occur in the future. Upon detection of the future event, the future messaging system in some embodiments provides content to a set of one or more recipients. Alternatively, in some embodiments, the future messaging system only provides notification of the detection to the set of recipients. In some embodiments, a user provides the content for release upon the detection of the future event. Along with this content, the user in some embodiments provides a description of the event and a list of one or more recipients for receiving the content upon the detection of the event.

22 Claims, 17 Drawing Sheets

(56) References Cited

OTHER PUBLICATIONS

Author Unknown, "Blue Mountain", www.bluemountain.com/ecards/custom/addrinit, date unknown, but prior to Aug. 24, 2011, 3 pages.

Author Unknown, "Facing Mortality Gives Birth to New Technology", Feb. 11, 2014, 3 pages, PRWEB, New York, NY.

Author Unknown, "American Greetings", www.americangreetings.com/ecards/custom.pd, date unknown, but prior to Aug. 24, 2011, 2 pages.

* cited by examiner

US 8,984,077 B2

FUTURE MESSAGING SYSTEM

CLAIM OF BENEFIT TO PRIOR APPLICATION

This application claims the benefit of U.S. Provisional Patent Application 61/575,642, filed Aug. 24, 2011. Application 61/575,642 is hereby incorporated by reference.

BACKGROUND

Presently, when an individual wishes to have any type of communication (e.g., a letter, a photograph, a diary, etc.) delivered to a specific recipient or group of recipients upon or after the occurrence of a particular event that is not yet known, that has not yet occurred and/or that has not yet been scheduled, the individual typically must find a trusted person, such as an estate attorney, a close friend, and/or a spouse to store and maintain the communication in a safe place and separately request the communication holder to deliver the communication to the designated recipient(s) when the event occurs.

Entrusting a person to deliver the communication upon the occurrence of a particular event has many disadvantages. First, it allows for only a limited number of transactions worldwide. Second, the person maintaining or storing the communication may pass away or fail to establish or maintain a system in place to ensure delivery of the communication. Third, the content creator may not have informed the recipient(s) to contact the person maintaining the communication upon a certain event or events occurring. Fourth, non-digital media content often degrades or is difficult to view over time. Fifth, digital media may not be readily viewable by recipients on a timely basis due to media encoding and re-encoding challenges. Sixth, the content creator and/or the person maintaining the communication may fail to notice the occurrence of the event upon which the communication is to be delivered.

BRIEF SUMMARY

Some embodiments of the invention provide a future messaging system that can be configured to analyze data from one or more data sources in an automated manner in order to detect with a degree of accuracy the occurrence of a possible future event, which may or may not occur. Upon detection of the future event, the future messaging system in some embodiments provides content to a set of one or more recipients. Alternatively, in some embodiments, the future messaging system only provides notification of the detection to the set of recipients.

In some embodiments, a user provides the content for release upon the detection of the future event. Along with this content, the user in some embodiments provides a description of the event and a list of one or more recipients for receiving the content upon the detection of the event. The description of the event in some embodiments specifies a group of one or more event condition rule sets (ECRS'), or can be used to derive such an ECRS group. Each ECRS includes one or more event condition rules (ECRs) that can be used to specify search and/or analysis of data from data sources to detect the occurrence of an event.

In some embodiments, each ECR or each ECRS specifies a search expression, or can be used to derive such an expression, so that the system can search for one or more data sources for data that satisfies the search expression. The system of some embodiments uses the search expression to perform analysis on the data stored in the data sources, in order to determine whether data exists in the data sources that satisfies the ECR or ECRS. For instance, in some embodiments, the system uses the search expression to perform semantic analysis in order to determine whether in the data source a particular pattern of words exists that satisfies the ECR or ECRS. In other embodiments, the system uses the search expression to perform an image analysis in order to determine whether a particular image pattern (e.g., face) can be identified in particular images (e.g., images on cover pages of particular magazines) that are stored by particular data sources.

Different embodiments specify the detection of an event differently. To specify a detected event, some embodiments require all ECRS' of a group of ECRS that is associated with a particular event definition to be satisfied. Other embodiments require only some of the ECRS' of the group of ECRS to be satisfied. Yet other embodiments require all ECRS' of a first group of ECRS' for a first event to be satisfied, while requiring only a subset of the ECRS' of a second group of ECRS' for a second event to be satisfied. Also, some embodiments require all ECRs for an ECRS to be satisfied before the ECRS is deemed to be satisfied, other embodiments require only some of the ECRs for an ECRS to be satisfied before the ECRS is deemed to be satisfied, and yet other embodiments require the satisfaction of all ECRs for some ECRS' while allowing partial satisfaction of the ECRs for other ECRS'.

One of ordinary skill will realize that some embodiments might not divide the ECRs into different sets. On the other hand, in case of embodiments that do divide the ECRs into different sets, different of these embodiments divide the ECRs into different ECRS' differently. Some divide the ECRs into different sets based on the different data sources, others divide the ECRs into different sets based on different types of analysis, yet others divide the ECRs into different sets based on a variety of different criteria.

It would be useful to describe one example of specifying an event for some embodiments. In some embodiments, an event might be specified in terms of a first ECRS that specifies a semantic analysis for text, and a second ECRS that specifies an image analysis of the images associated with the text. The first ECRS might have two ECRs, while the second ECRS might have one ECR. The system might specify a detected event when either ECR of the first ECRS is satisfied along with the ECR of the second ECRS. In addition, even when the ECR of the second ECRS is not satisfied, this system might still specify a detected event if both the ECRs of the first ECRS are satisfied.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details, examples and embodiments are set forth for purpose of explanation. However, one of ordinary skill in the art will realize that the invention is not limited to the embodiments set forth and that the invention may be practiced without some of the specific details and examples discussed.

Some embodiments of the invention provide a future messaging system that can be configured to analyze data from one or more data sources in an automated manner in order to try to detect occurrence of a future event, which may or may not occur. Upon detection of the future event, the future messaging system in some embodiments provides content to a set of one or more recipients. Alternatively, in some embodiments, the future messaging system only provides notification of the detection to the set of recipients.

In some embodiments, a user provides the content for release upon the detection of the future event. Along with this content, the user in some embodiments provides a description of the event and a list of one or more recipients for receiving the content upon the detection of the event. The description of the event in some embodiments specifies a group of one or more event condition rule sets (ECRS'), or can be used to derive such an ECRS group. Each ECRS includes one or more event condition rules (ECRs) that can be used to specify search and/or analysis of data from data sources to detect the occurrence of an event.

Figure 1:
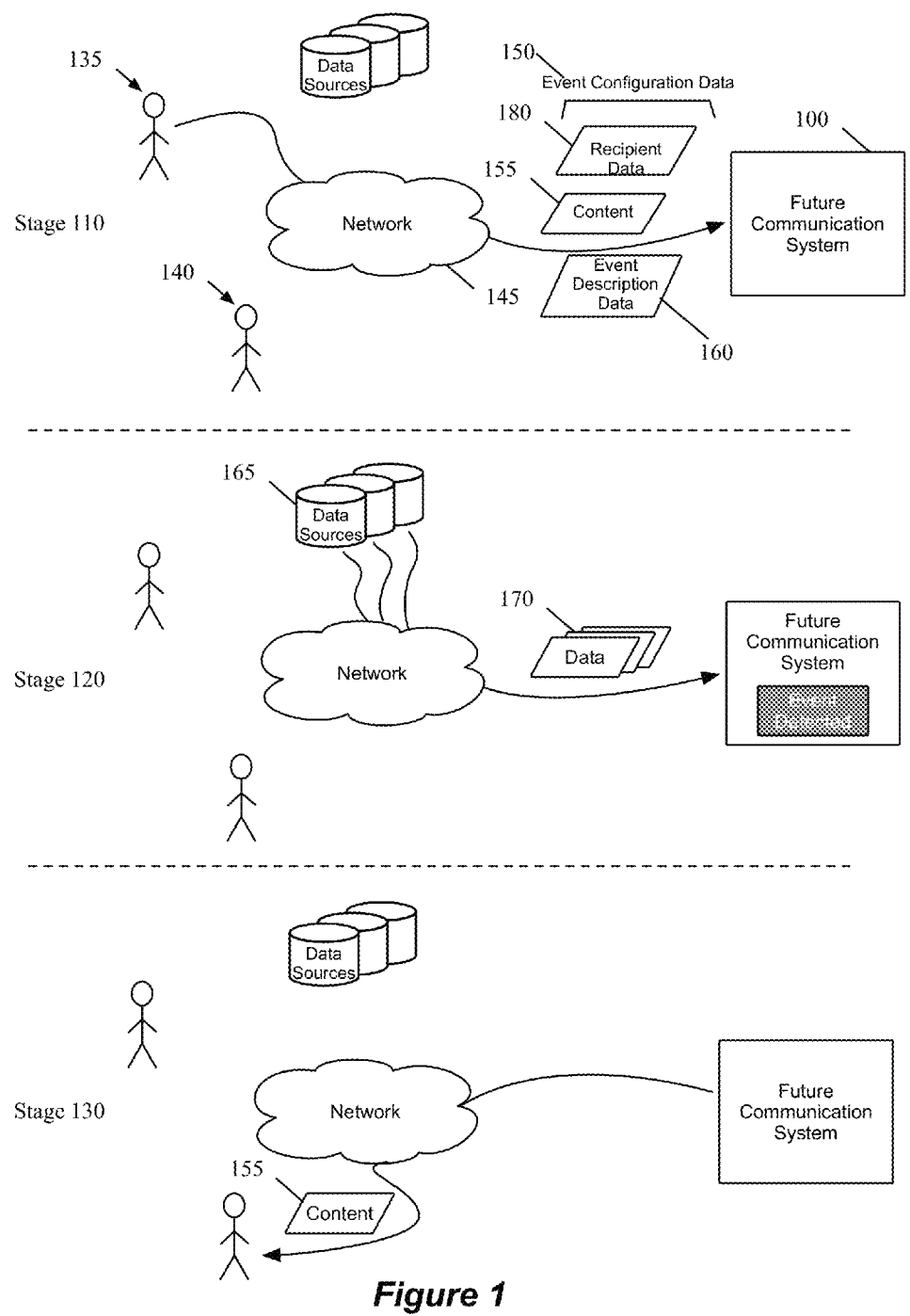
FIG. 1 conceptually illustrates a content release feature of a future communication system according to some embodiments of the invention.

FIG. 1 conceptually illustrates a content release feature of a future communication system 100 according to some embodiments of the invention. Specifically, FIG. 1 illustrates the system 100 at three different stages 110-130 of a future messaging operation according to some embodiments of the invention.

The first stage 110 illustrates the future communication system 100 receiving event configuration data from a user (e.g., an individual defining the event configuration data). As shown at this stage, the future communication system 100 is receiving event configuration data 150 from a user 135 through a network 145. The event configuration data 150, in some embodiments, is any type of communication that relies on any number of different types of technology, devices, platforms, or media that allows individuals, groups of individuals, and/or entities to share, send, receive, view, etc., both digital content and non-digital content.

In some embodiments, the network 145 is a local area network (LAN), a wireless local area network (WLAN), a wide area network (WAN), an intranet, the Internet, a telephone network, a radio network, a cellular network, a network of networks, and/or any other type or combination of networks. A particular type of network may include additional features and/or services that utilize the network for communication. For instance, a cellular network may include a short message service (SMS) feature.

The future communication system 100 of some embodiments utilizes numerous different types of protocols to communicate with the users 135 and 140 through the network 145. Example of such protocols include an Internet Protocol Suite, a transmission control protocol (TCP)/Internet Protocol (IP), a user datagram protocol (UPD), a hypertext transfer protocol (HTTP), a hypertext transfer protocol secure (HTTPS), and/or any other medium, layer, or protocol used for networking and communicating.

As illustrated in the first stage 110 of FIG. 1, the event configuration data 150 includes content 155, event description data 160, and recipient(s) data 180. In some embodiments, the content 155 includes video, audio, photos, text, or any other type of digital media. In other words, the content 155 is media agnostic. In addition, the content 155 of some embodiments includes a combination of any number of the same and/or different types of digital media.

The event description data 160 includes data that defines an event for triggering the release of the content 155 to recipients specified in the recipient(s) data 180. In this example, the user 135 has defined the event configuration data 150 such that the content 155 is to be released to recipient 140 (who may also be a user of the system 100) upon the occurrence of a future event that is specified by the event description data 160. In some embodiments, the future communication system 100 stores the content in a cloud storage.

In some embodiments, a user provides content for delivery upon detection of a future event. Along with this content, the user in some embodiments provides a list of one or more recipients for receiving the content upon the detection of the event, and a description of the event. The description of the event in some embodiments specifies a set of one or more event condition rule sets, or can be used to derive such a set of event condition rule sets.

In some embodiments, each event condition rule or rule set specifies a search expression, or can be used to derive such an expression, so that the system can search for one or more data sources for data that satisfies the search expression. The system of some embodiments uses the search expression to perform analysis on the data stored in the data sources, in order to determine whether data exists in the data sources that satisfies the event condition rule or rule set. For instance, in some embodiments, the system uses the search expression to perform semantic analysis in order to determine whether in the data source a particular pattern of words exists that satisfies the event condition rule or rule set. In other embodiments, the system uses the search expression to perform an image analysis in order to determine whether a particular image pattern (e.g., face) can be identified in particular images (e.g., images on cover pages of particular magazines) that are stored by particular data sources.

The event condition rule sets are used to determine whether an event has occurred. Examples of such events include the death of a particular person, the marriage of a particular person that was recently born, the legalization of gay marriage, the election of the first female U.S. President, the next 9.0 earthquake, etc. One of ordinary skill in the art will realize that there are an infinite number of event condition rule sets that can be specified to define such events upon which content is released to recipients. In addition, the specified event may be an individual event, a series of events, or a series of events occurring in a particular order in some embodiments.

In some embodiments, the event that is used as the criteria for determining when to release the content 155 is an event that has not yet occurred at the time the event description data 160 is specified. The event in some embodiments is an event that has not yet occurred and has not been scheduled to occur at the time the event description data 160 is specified. As a result, in some cases the event may never occur.

In some embodiments, the event description data 160 also includes data that specifies a set of data sources to use for detecting the event. For an event defined by multiple event condition rules or rule sets, the event description data 160 includes data that specifies a set of data sources for each event condition rule or rule set in the event definition.

The recipient(s) data 180 includes a set of recipients to which the content 150 is to be released when the occurrence of the event specified by the event description data 160 is detected. In some embodiments, the recipient(s) data 180 also includes data, such as authentication information for authenticating each recipient and a recipient address for each recipient. In some embodiments, a recipient address is a location identified as belonging to a recipient (e.g., an email address, a Facebook® account, a Twitter® account, a home address, a mobile phone number, a physical address, etc.).

In some embodiments, the future communication system 100 provides mechanisms through which users may specify event configuration data. For instance, the system 100 may provide a web application for the user to specify event configuration data through a web browser operating on a computing device, and/or a web service that the user uses to specify event configuration data. The system 100 provides additional and/or other mechanisms in different embodiments. Alternatively or in conjunction with providing the mechanisms, the system 100 of some embodiments allows users to send the system 100 event configuration data that the users specified through applications operating on a mobile device, a desktop computer, or any other type of computing device that can communicate with the system 100 (e.g., any device that is capable of sending and receiving data). As another example, the future communication system 100 of some embodiments provides a service (or communicates with an entity that provides the service) that allows a user to call a telephone number (e.g., a toll-free phone number) to record audio content as part of content released to recipients.

While FIG. 1 shows the system 100 receiving the content 155, the event description data 160, and the recipient(s) 180 together and/or at the same time, in some embodiments, the system 100 receives the content 155, the event description data 160, and the recipient(s) 180 separately and/or at different instances in time (e.g., through multiple transactions with the user's device).

The second stage 120 of FIG. 1 shows the system 100 scanning a set of data sources 165 (e.g., via queries or other manners of accessing the data sources) to detect the occurrence of an event condition rule set of the event defined by the event description data 160. In the second stage 120, the future communication system 100 is receiving data 170 from the data sources 165 through the network 145. Based on the data 170 gathered from the data sources 165, the system 100 has detected an event (i.e., that the event conditions rule sets are matched), as indicated in the future communication system 100 module.

In some embodiments, a data source is a uniquely identifiable set of data repositories that contains any number of different types of data (e.g., raw data, indexed data, collected data, aggregated data, organized data, etc.). A data source of some embodiments may be an online data source, an offline data source, etc. In addition, a data source may be part of different portions of the World Wide Web (e.g., the surface web, the deep web, etc.).

To detect an event, the future communication system 100 of some embodiments accesses any number of different data sources (e.g., specified by the system 100, specified by the user that defined the event configuration data, or a combination of both). In order to detect an event, the system 100 of some embodiments accesses any number of different data sources, which may be based on the type of event or type of event condition rule sets. Examples of data sources include Google® search, the Facebook® website, the Twitter® website, a government (e.g., state, city, county, etc.) record database, the Social Security Administration Office's record database, global positioning system (GPS) coordinates of a particular device (e.g., mobile phone), etc.

In some embodiments, the system 100 accesses data from the set of data sources 165 (e.g., by querying for data from the set of data sources) to automatically detect the occurrence of an event without human intervention, interaction, and/or assistance. For instance, the future communication system 100 of some embodiments continuously scans the set of data sources 165 for data that indicates that the event for causing the content to be released has occurred. The system 100 of some embodiments scans the set of data sources 165 periodically at defined intervals (e.g., thirty seconds, five minutes, an hour, a day, etc.). In some embodiments, the system 100 provides an on-demand feature that allows a user to invoke a scan at any time. Regardless of the frequency at which the future communication system 100 scans the set of data sources 165, the system 100 uses the data retrieved from the set of data sources 165 to make a determination as to whether the event has occurred or not. For example, in some embodiments, when the data sources 165 do not return any data after the system 100 queries the set of data sources 165 for data related to the event, the system 100 determines that the event has not occurred.

When the system 100 receives data from a data source in the set of data sources 165 in response to queries of the data sources 165, the system 100 analyzes the data in order to determine whether the specified event condition rule sets of the event have been satisfied. For example, the system 100 analyzes the data in some embodiments by determining the validity of the data. In addition, the future communication system 100 of some embodiments also analyzes the data by determining the credibility of the data sources from which the data was received. In this manner, the system 100 provides a level of accuracy in detecting an event.

The third stage 130 of FIG. 1 illustrates the release of the content 155 to the recipients specified in the recipient(s) data 180. In particular, the third stage 130 shows the future communication system 100 releasing the content 155 to the recipient 140. In different embodiments, the system 100 triggers the release of the content 155 to the recipient 140 using any number of different methods. For example, in some embodiments, the system 100 releases the content 155 to the recipient 140 by (1) sending a message (e.g., an email, a Facebook® post, a tweet, etc.) to the recipient 140 that indicates that the content 155 is available for access and (2) allowing the recipient 140 to view, download, stream, share, forward, etc. the content 155. Alternatively or in conjunction with any of the mentioned release methods, the system 100 transmits the content 155 through the network 145 to the recipient 140 and/or to a location identified as belonging to the recipient 140 (e.g., the recipient 140's email address, Facebook® account, Twitter® account, home address, mobile phone, physical address, etc.). Although FIG. 1 illustrates the content 155 as being released from the future communication system, in some embodiments the content is stored in a cloud storage, and the future communication system triggers the release of the content from the cloud to the recipient.

In some embodiments, the system 100 releases the content 155 by automatically generating a physical reproduction of some or all of the content 155. For example, if the content 155 includes photos or text and the contact information of a recipient includes a physical address, the system 100 of some embodiments automatically prints the photos and text for delivery to the physical address.

The future communication system 100 of some embodiments authenticates the identity of the recipient 140 before releasing the content 155 to the recipient 140. For instance, the system 100 of some embodiments requests authentication information (e.g., provided by the user 135 when the user 135 defined the recipient(s) data 180) from the recipient 140 in order to determine that the recipient 140 is indeed the intended recipient of the content 155. Examples of authentication information include a social security number, a driver's license number, the recipient 140's mother's maiden name, the name of the recipient 140's first pet, the names of each of the recipient 140's parents, or any other type of information for determining the identity of the recipient 140. In some embodiments, the system 100 requests the recipient 140 provide a combination of different authentication information in order to authenticate the identity of the recipient 140.

While FIG. 1 illustrates an example of content that is for release to one individual, a user may specify any number of the same and/or different recipients. For instance, the recipients of content may include an individual, a group of individuals, folders, public forums, websites, blogs, a public gallery or repository, data storage banks, newspaper publishers, non profit organizations, governmental agencies, or any other type of entity that is capable of receiving or accessing the content once the system 100 releases it.

Figure 2:
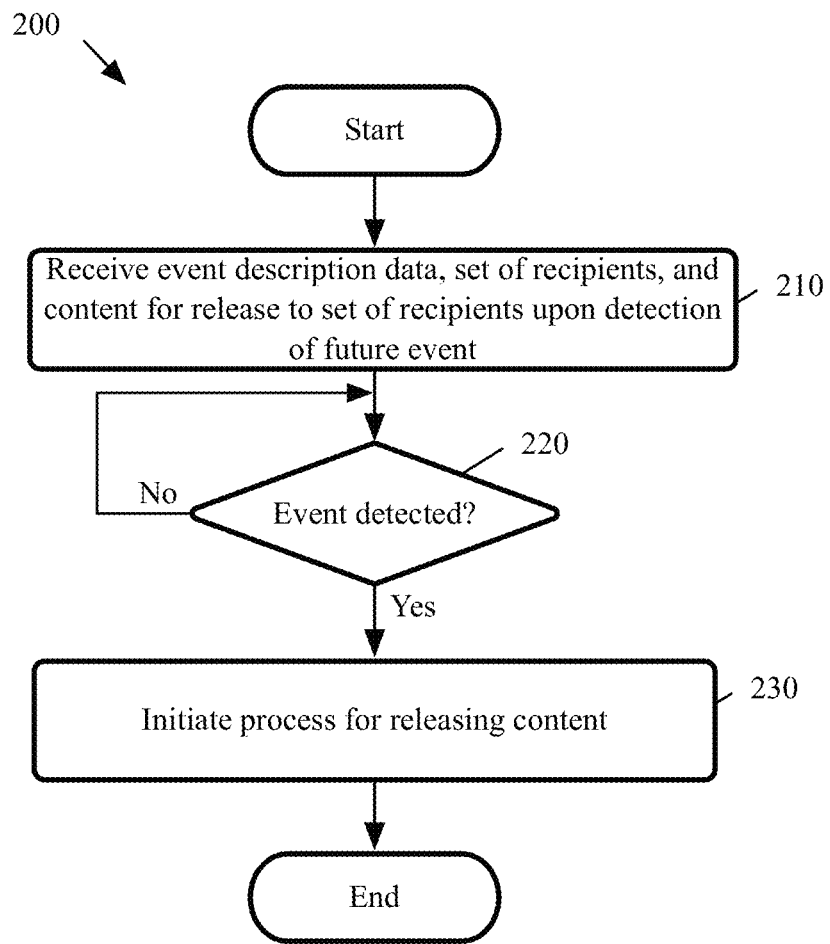
FIG. 2 conceptually illustrates a process of some embodiments for processing a set of event configuration data.

FIG. 2 conceptually illustrates a process 200 of some embodiments for processing a set of event configuration data. In some embodiments, the system described above by reference to FIG. 1 performs the process 200 to implement a future messaging feature provided by the system. The system 100 of some embodiments performs the process 200 for each event and associated content that the system receives, until that content is released.

The process 200 starts by receiving (at 210) event description data, a set of recipients, and content for release to the set of recipients upon the detection of a future event. In some embodiments, the event description data specifies a set of event condition rule sets of an event that has not yet occurred. The process the process 200 receives the set of recipients as data included recipient data (e.g., recipients data 180 shown in FIG. 1). The content (e.g., video, audio, photos, text, etc.) is for release upon the detection of the occurrence of an event. The process 200 may receive the event description data, the set of recipients, and the content together at the same time, or may receive the event description data, set of recipients, and content separately and/or at different times (e.g., in separate transactions).

Next, the process 200 determines (at 220) whether the event is detected. Different embodiments employ any number of different techniques to determine whether the event is detected. For example, the process 200 of some embodiments accesses a set of data sources to search for data that satisfies the event condition rule sets specified for the event. As described above, different data sources are accessed for detecting whether the event has occurred. In some embodiments, the process 200 analyzes the data retrieved from the set of data sources (e.g., validating the data, assessing the credibility of the data's data sources, etc.). When the process 200 determines that the event is not detected, the process 200 returns to 220 to continue determining whether the event is detected (e.g., immediately, after a specified period of time, etc.).

Once the process determines that the event has been detected, the process initiates (at 230) a process that triggers the release of the content to the set of recipients specified in the recipient data. As noted above, recipients of content may include a variety of different entities that can access the content. In some embodiments, the process 200 requests each recipient of the content to authenticate the recipient's identity by requesting from the recipient information that uniquely identifies the identity of the recipient. Either automatically, or once a recipient has been authenticated, the process of some embodiments releases the content to the user (e.g., from a cloud storage at which the content is stored).

Some of the figures describe above and below illustrate users of the future communication system of some embodiments as individuals or persons for purposes of simplicity and explanation. The users of the future communication system of some embodiments may include a group of individuals, an entity (e.g., a university, a corporation, a non-profit organization, a newspaper, etc.), a computing device, etc.

Several more detailed embodiments are described below. Section I describes details of the overall system of some embodiments. Section II then describes details of the front-end system of some embodiments. Section III describes the details of the back-end system of some embodiments. Section IV describes other content release features of the future communication system of some embodiments. Finally, Section V describes an electronic system with which some embodiments of the invention are implemented.

I. Overall System

Figure 3:
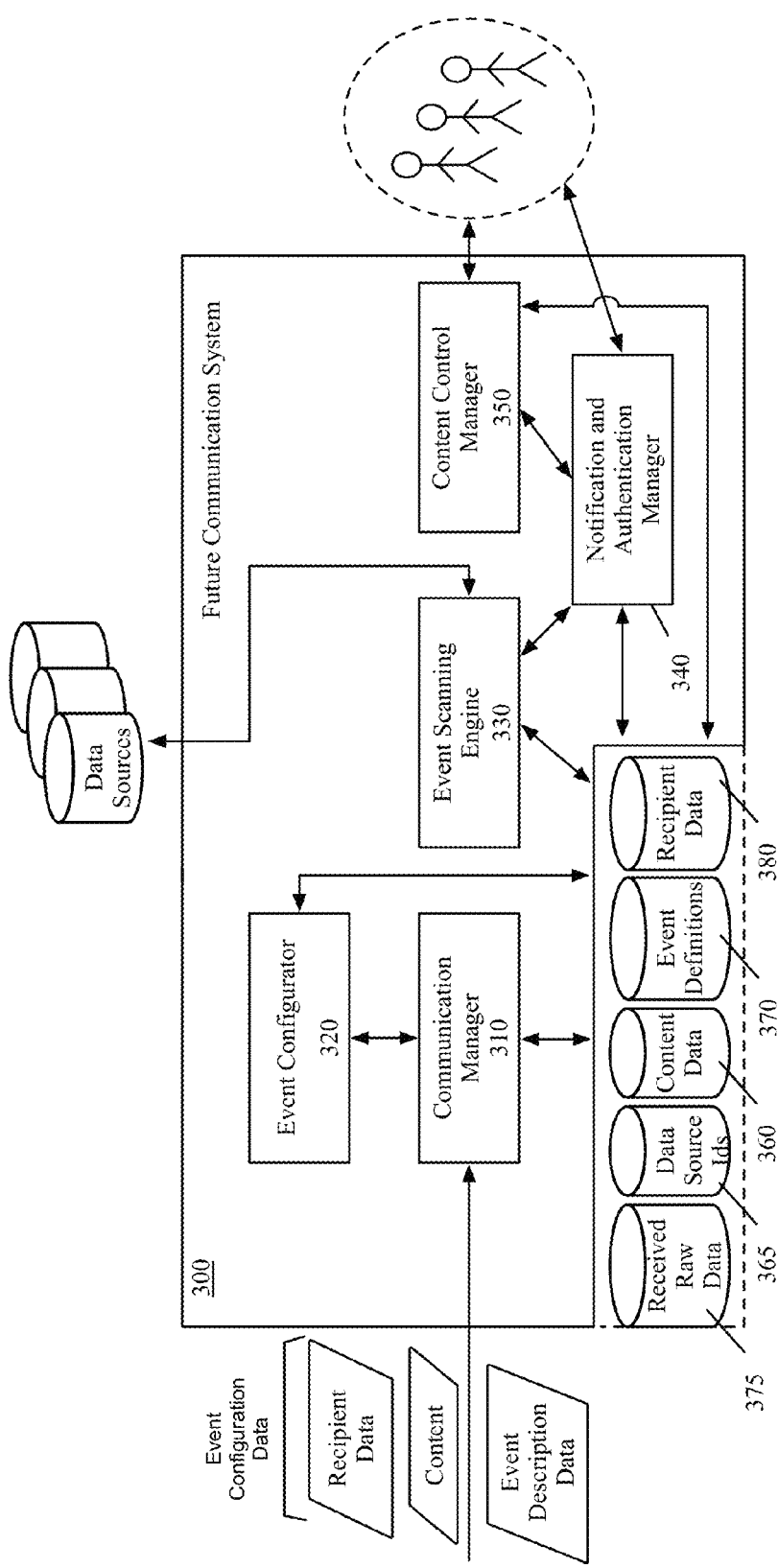
FIG. 3 conceptually illustrates a software architecture of a future communication system of some embodiments.

FIG. 3 conceptually illustrates a software architecture of a future communication system 300 of some embodiments. In some embodiments, the future communication system 300 implements the future communication system described above by reference to FIG. 1. The system 300 of some embodiments implements the process described above by reference to FIG. 2. In some embodiments, the system 300 is implemented by several servers that each implements one or more components of the system 300. The future communication system 300 of some embodiments is implemented by one server.

As shown, the future communication system 300 includes a communication manager 310, an event configurator 320, an event scanning engine 330, a notification and authentication manager 340, and a content control manager 350. The future communication system 300 also includes content data storage 360, event definitions storage 370, recipient data storage 380, data source identifiers (IDs) storage 365, and received raw data storage 375.

The content data storage 360 stores content for release upon the detection of an event (or series of events). As described above, in some embodiments, the content includes video, audio, photos, text, or any other type of digital media, or a combination of any number of the same and/or different types of media. The event definitions storage 370 stores data generated by the event configurator 320 for use by the event scanning engine 330 to detect events that trigger the release of content to designated recipients of the content. The recipient data storage 380 stores information about the recipients of the content (e.g., recipients' IDs, recipient contact information, authentication rules and/or IDs, mechanisms for releasing content, etc.). The received raw data storage 375 stores unprocessed event configuration data (e.g., event description data, recipient data, and content) as received by the system 300. The data source IDs storage 365 stores unique data source IDs and the data source information to which the data source IDs refer. In some embodiments, the data source information to which a particular data source ID refers includes data source location information (e.g., a website uniform resource locator (URL), an Internet Protocol (IP) address, a Media Access Control (MAC) address, etc.) and data source access information (e.g., an application programming interface (API), a database connection string, a username and password, etc.).

In some embodiments, the storages 360-380 are stored in one physical storage while, in some embodiments, the storages are stored on separate physical storages. Still, in some embodiments, some of the storages 360-380 are stored in one physical storage while other storages 360-380 are stored in separate physical storages. For example, some embodiments store some or all of the data in cloud storage. For example, some embodiments store the content data 360 in one or more cloud storages, while the other data is stored in physical storage local to the system 300.

The communication manager 310 is responsible for managing sets of event configuration data that are received from users of the future communication system 300. As shown in FIG. 3, a set of event configuration data includes event description data, content data, and recipient data. In some embodiments, when the communication manager 310 receives a set of event configuration data, the communication manager 310 stores the set of event configuration data in the received raw data storage 375. In addition, the communication manager 310 sends the event description data and the recipients data to the event configurator 320 for processing.

In some embodiments, the communication manager 310 provides mechanisms (e.g., a web application, a web service, etc.) through which users may define a set of event configuration data for transmission to the communication manager 310. Alternatively, or in conjunction with providing such mechanisms, the communication manager 310 of some embodiments allows users to send the communication manager 310 sets of event configuration data that the users defined through applications operating on a mobile device, a desktop computer, or any other type of device that can communication with the system 300.

In some embodiments, the communication manager 310 also handles the processing of a portion of the event configuration data. For instance, the communication manager 310 of some embodiments processes (e.g., normalizes, transcodes, etc.) the content data and stores the processed content data in the content data storage 360 (e.g., sends the data to a cloud storage system).

In some embodiments, the communication manager 310 generates additional content data to store along with the processed content data. For example, the communication manager 310 may generate URLs to Wikipedia entries, books for purchase, photos, articles, etc. that relate to the event condition rule sets of an event associated with the content data. The system 300 of some embodiments releases both the user-specified content data (i.e., the processed content data) and the system-generated content to specified recipients when the occurrence of the event is detected. As described in further detail below, when the event is detected, the future communication system 300 of some embodiments generates additional content data to release to the specified recipients.

The event configurator 320 is in charge of processing some of the data in the set of event configuration data. As noted above, the event configurator 320 receives the event description data and the recipient data from the communication manager 310 for processing, in some embodiments. To process the recipients data, the event configurator 320 of some embodiments performs data cleansing operations, data normalization operations, etc. to the recipient data before storing the data in the recipient data storage 380. In some embodiments, the event configurator 320 applies additional and/or different processing operations to the recipient data.

In some instances, the event configurator 320 generates additional recipient data and stores it with the user-specified recipient data. For instance, the event configurator 320 of some embodiments generates authentication rules and/or IDs and stores them in the recipient data along with any authentication rules and/or IDs specified in the recipient data.

In some embodiments, the event configurator 320 uses the event description data to generate an event definition for the event scanning engine 330 to use for event detecting operations. For instance, the event configurator 320 of some embodiments generates the event definition based on the event condition rule sets of the event, the data sources, and the validation data in the event description data. Once the event definition is generated, the event configurator 320 stores it in the event definitions storage 370.

The event scanning engine 330 is responsible for detecting the occurrence of events defined for the release of content. As explained above, different embodiments use different techniques to detect the occurrence of events. In some embodiments, the event scanning engine 330 detects events by continuously scanning the specified data sources of events, periodically scanning the specified data sources at defined intervals, or scanning the specified data sources in response to a user's invocation of an on-demand scan feature.

In some embodiments, the event scanning engine 330 detects the occurrence of events based on the event definitions in the event definitions storage 370. When the event scanning engine 330 is scheduled to determine whether an event has occurred, the event scanning engine 330 identifies the corresponding event definition in the event definitions storage 370. Based on the identified event definition, the event scanning engine 330 accesses a set of user-specified data sources and/or system-specified data sources, and retrieves data from the data sources in order to determine whether the event is detected. The event scanning engine 330 of some embodiments performs various analysis operations on the data received from the data sources (e.g., by validating the data, determining the credibility of the data sources from which the data is retrieved, etc.) in order to determine whether the event is detected.

When the event scanning engine 330 detects the event, the event scanning engine 330 sends a message to the notification and authentication manager 340 to trigger the release of the content associated with the event to specified recipients of the content. In some embodiments, the event scanning engine 330 stores in the event definitions storage 370 data indicating that the event is detected, in order for the event scanning engine 330 to refrain from scanning data sources to attempt to detect the event.

As shown in FIG. 3, the event scanning engine 330 scans several data sources. One of ordinary skill in the art will understand that the several data sources illustrated in FIG. 3 are only for purposes of simplicity and explanation and that the event scanning engine 330 may access and/or scan any number of data sources for detecting an event.

The notification and authentication manager 340 handles the release of content when events associated with the content are detected. In some embodiments, the notification and authentication manager 340 receives messages from the event scanning engine 330 to trigger the release of content to specified recipients of the content for a detected event.

When the notification and authentication manager 340 receives a message to release content for a detected event, the notification and authentication manager 340 accesses the event definitions storage 370 to identify the event definition of the detected event. Based on the identified event definition, the notification and authentication manager 340 (1) accesses the content data storage 360 to identify the content to release and (2) accesses the recipient data storage 380 to identify the recipients to which the content is to be released.

The notification and authentication manager 340 of different embodiments triggers the release of content to the recipients differently. For example, in some embodiments, the notification and authentication manager 340 sends a message (e.g., an email, a Facebook® post, an SMS message, a tweet, etc.) to the recipients that indicates that the content is available for access (e.g., on the system's storage, in cloud storage, etc.). Alternatively, or in conjunction with sending a message, the notification and authentication manager 340 sends the content to each of the specified recipients and/or to a location identified as belonging to the recipient (e.g., an email address, a Facebook® account, a Twitter® account, a mobile phone, etc.), or triggers the release of the content from cloud storage to the specified recipients. In some embodiments, the notification and authentication manager 340 requests each recipient to authenticate the recipient's identity. For example, the notification and authentication manager 340 of some embodiments requests from each recipient one or more pieces of information that uniquely identifies or verifies the identity of the recipient (e.g., the recipient's social security number, driver's license number, the names of each of the recipient's parents, etc.).

The content control manager 350 provides content to recipients specified to receive the content. In some embodiments, the content control manager 350 receives a request from the notification and authentication manager 340 to provide the content of a detected event to a specified set of recipients. The content control manager 350 of some embodiments also receives from the notification and authentication manager 340 information that includes (1) the manner in which the content is provided (e.g., upload, stream, email, print and mail, etc.) and (2) the recipient's location information (e.g., an Internet Protocol (IP) address, an email address, a mobile phone number, etc.). In some instance, the information that the content control manager 350 receives from the notification and authentication manager 340 also includes format information that indicates a particular format that the recipient requires to access the content. In some instances, before the content control manager 350 provides the content to the recipient, the content control manager 350 automatically transcodes the content to another media format based on the format information. Alternatively, or in conjunction with receiving the request and other content request information, the content control manager 350 of some embodiments receives such information directly from the recipient. In some such embodiments, the content control manager 350 requests authentication information from the recipient in a similar manner as that described above by reference to the notification and authentication manager 340.

An example operation of the future communication system 300 will now be described. The operation starts when the communication manager 310 receives a set of event configuration data from a user. As shown, the communication includes content that is for release to a set of recipients upon detection of an event, event description data that defines the event, and recipient data that specifies the set of recipients.

When the communication manager 310 receives the set of event configuration data, the communication manager 310 stores the unprocessed set of event configuration data in the received raw data storage 375. The communication manager 310 then performs a variety of different processing operations on the content and stores the processed content in the content data storage 360. Next, the communication manager 310 sends the event description data and the recipient data to the event configurator 320 for processing.

When the event configurator 320 receives the event description data from the communication processor 320, the event configurator 320 generates an event definition for the event scanning engine 330 to use in order to detect the occurrence of the event defined in the event description data (e.g., including a group of event condition rule sets). The event configurator 320 then stores the generated event definition in the event definitions storage 370 for the event scanning engine 330 to access at a later time.

When the event scanning engine 330 schedules an event detection operation for the event, the event scanning engine 330 performs the event detection operation in order to determine whether to trigger release of the content. To detect the occurrence of the event, the event scanning engine 330 uses the event definition to access a set of user-specified data sources and/or system-specified data sources, and retrieves data from the data sources. The event scanning engine 330 then analyzes the retrieved data (e.g., by performing semantic analysis on the data, validating the data, determining the credibility of the data sources from which the data is retrieved, etc.) in order to determine whether the event is detected.

Until the event scanning engine 330 detects the event, the event scanning engine 330 continuously scans the data sources, periodically scans the data sources at defined intervals, or scans the determined data sources in response to a user's invocation of an on-demand scan feature to determine whether the event has occurred. When the event scanning engine 330 determines that the event has occurred (i.e., the event scanning engine 330 has detected the event), the event scanning engine 330 (1) notifies the notification and authentication manager 340 to release the content and (2) stores in the event definitions storage 370 data indicating that the event has been detected.

When the notification and authentication manager 340 receives the notification from the event scanning engine 330 to release the content, the notification and authentication manager 340 accesses the event definitions storage 370 to identify the detected event. Based on the identified event, the event definitions storage 370 (1) accesses the recipient data storage 380 to identify the specified recipients of the content and (2) accesses the content data storage 360 to identify the content. For each recipient, the notification and authentication manager 340 of some embodiments requests the recipient to authenticate the recipient's identity by requesting from the recipient one or more pieces of information that uniquely identifies the identity of the recipient (e.g., the recipient's social security number, driver's license number, employer identification number (EIN), the names of each of the recipient's parents, etc.). After the recipient successfully authenticates the recipient's identity, the notification and authentication manager 340 sends a message (e.g., an email, a Facebook® post, an SMS message, a tweet, etc.) to the recipient that indicates that the content is available for the recipient to access.

When any of the recipients of content request to access the content, the content control manager 350 provides the content to recipient in the manner requested, in some embodiments. When the recipient requests the content in a particular format, the content control manager 350 of some embodiments automatically transcodes the content to the requested format and then provides the transcoded content to the recipient.

II. Front-End System

As described above, some embodiments provide a future communication system for releasing content to recipients upon the occurrence of defined events for the content. In some embodiments, the future communication system includes a front-end system that handles the processing of content created by and received from users of the system. Specifically, the front-end system facilitates the creation of content and configures events for event detection operations performed by the back-end system of the future communication system of some embodiments. The following section will describe various examples and embodiments of a front-end system that implements the content creation and event configuration features of the future communication system of some embodiments.

A. Communication Manager

Figure 4:
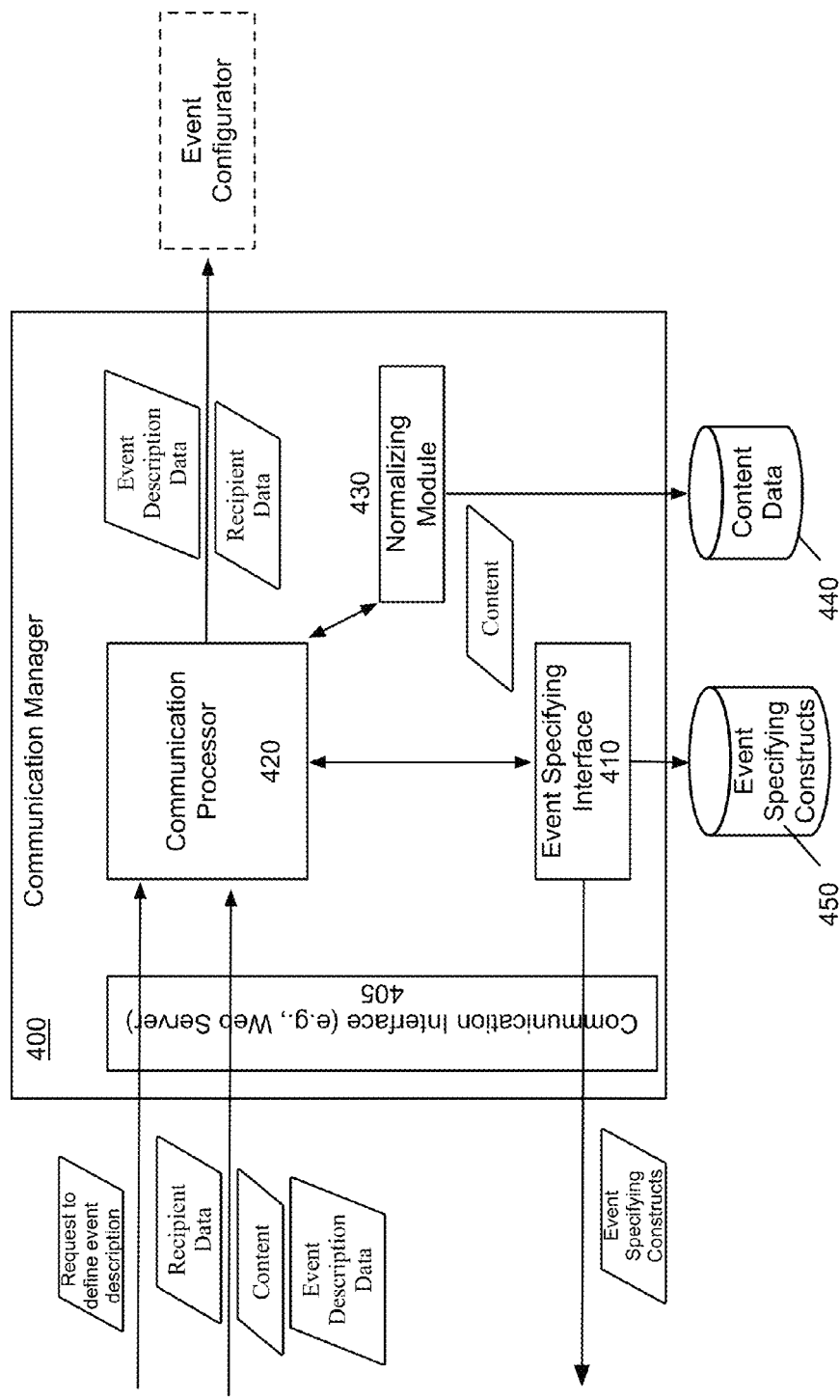
FIG. 4 conceptually illustrates a software architecture of a communication manager of some embodiments.

FIG. 4 conceptually illustrates a software architecture of a communication manager 400 of some embodiments. In some embodiments, the communication manager 400 implements the communication manager described above by reference to FIG. 3. The communication manager 400 is implemented by several servers that each implements one or more components of the communication manager 400, in some embodiments. The communication manager 400 of some embodiments is implemented by one server.

As illustrated in FIG. 4, the communication manager 400 includes a communication interface 405, an event specifying interface 410, a communication processor 420, and a normalizing module 430. In addition, the communication manager 400 includes a content data storage 440 and an event specifying constructs storage 450.

The content data storage 440 is similar to the content data storage described above by reference to FIG. 3. That is, the content data storage 440 stores content for release upon the occurrence of one or more event condition rule sets specified in the definition of the event. The event specifying constructs storage 450 stores (1) event specifying constructs and (2) different event specifying definitions that specify different sets of event specifying constructs for different types of events. In some embodiments, an event specifying definition specifies one or more of the same and/or different event specifying constructs. In some embodiments, an event specifying construct includes a set of data fields and/or a set of operators (e.g., greater than, less than, equal to, not equal to, etc.) that operate on one or more of the data fields.

The event specifying constructs storage 450 of some embodiments also stores a unique construct ID for each event specifying construct stored in the event specifying constructs storage 450. This way, the event specifying constructs storage 450 stores one instance of a particular event specifying construct. Any event specifying definition that is defined to include the particular event specifying construct references the construct ID of the particular event specifying construct.

The communication interface 405 facilitates communication between users and the communication manager 400. In some embodiments, the communication interface 405 translates data, information, and/or signals between the users and the communication manager 400. In some embodiments, the communication interface 405 includes a web server, a web service, and/or any other type of mechanisms for communication with users, etc.

For instance, when the communication interface 405 receives a request from a user through a web application running in a web browser of the user's computing device to define an event description, the communication interface 405 identifies the type of event the user is requesting and forwards the identified type of event to the event specifying interface 410.

Continuing with the example, when the communication interface 405 receives from the event specifying interface 410 a set of event specifying constructs in response to the user's request, the communication interface 405 processes the data in a format that is compatible with the web application and/or the manner in which the web application communicates.

As another example, when the communication interface 405 receives from a user a set of event configuration data created by an application operating on the user's desktop computer as a series of data packets, the communication interface 405 collects the data packets, reconstructs the event description data, the content, and the recipients data, and forwards it to the communication processor 420 for processing.

The event specifying interface 410 provides to a user a set of event specifying constructs for the user to define an event description. In some embodiments, the event specifying interface 410 provides different sets of event specifying constructs based on requests to define event descriptions for different types of events. This allows the future communication system of some embodiments to effectively detect the occurrence of different types of events. For instance, when a user defines content to be released upon an individual's death, the event specifying interface 410 provides one particular set of event specifying constructs. For instance, an example of an event specifying construct includes a first data field for receiving input of a name of the individual, a second data field that describes the first data field (e.g., "Name"), and an equal operator operating on the two fields. Additional event specifying constructs for this example include a date of birth of the individual, an address of the individual, the individual's family members, a social security number of the individual, etc.

When the user defines content to be released when an individual graduates from college, the event specifying interface 410 provides a different set of event specifying constructs (e.g., name of individual, name of college, etc.). In some embodiments, the event specifying interface 410 also provides suggestions of event specifying constructs other than the event specifying constructs defined for the particular type of event that the user is defining in order to allow the system to better detect the occurrence of the event.

When the event specifying interface 410 receives a request from a user to define an event description for a particular type of event, the event specifying interface 410 accesses the event specifying constructs storage 450 to identify the event specifying definition for the particular type of event. Based on the identified event specifying definition, the event specifying interface 410 identifies the specified set of event specifying constructs in the event specifying construct storage 450, which the event specifying interface 410 provides to the user.

The communication processor 420 is responsible for managing data sent to the communication manager 400. For instance, when the communication processor 420 receives through the communication interface 405 a request from a user to define an event description, the communication interface 405 forwards the request to the event specifying interface 410 to handle the request, in some embodiments.

When the communication processor 420 receives through the communication interface 405 a set of event configuration data from a user, the communication interface 405 of some embodiments forwards the event description data and the recipient data to the event configurator for processing.

In some embodiments, a user may define a set of event configuration data that allows the user as well as other individuals to add content to the content that will be released upon the detection of an event. When the communication processor 420 of some such embodiments receives content from the user and/or other users, the communication processor 420 identifies the event to which the content belongs and associates the content with the identified event before forwarding the content to the normalizing module 430 for processing and storing in the content data storage 440.

The normalizing module 430 processes content received from the communication processor 420 and stores it in the content data storage 440. When the normalizing module 430 receives content from a set of event configuration data, the module of some embodiments performs normalization operations on the content and, in some cases, automatically transcodes the content into a particular format (e.g., a format commonly requested by users, a lossless format, a compressed format for reducing storage space, etc.) before storing the content in the content data storage 440.

As discussed above, the communication manager of some embodiments generates additional content data to store along with the processed content data. In this example, the normalizing module 430 generates the system-specified content data and stores it in the content data storage 440.

An example operation of the communication manager 400 will now be described. The operation begins when the event specifying interface 410 receives a request from a user through the communication interface 405 for defining an event description for a particular type of event. Based on the request, the event specifying interface 410 accesses the event specifying constructs storage 450 to identify the event specifying definition for the particular type of event. The event specifying interface 410 then sends the specified set of event specifying constructs in the identified definition to the user.

Next, the communication processor 420 receives a set of event configuration data that includes content for release to a set of recipients upon detection of an event, event description data that defines the event, and recipient data that specifies the set of recipients. The communication processor 420 forwards the content to normalizing module 430 for processing and storing. The communication processor 420 forwards the event description data and the recipient data to the event configuration for processing. When the normalizing module 430 receives the content, the normalizing module 430 performs normalization operations on the content, automatically transcodes the content into a particular format, and stores the content in the content data storage 440.

Figure 5:
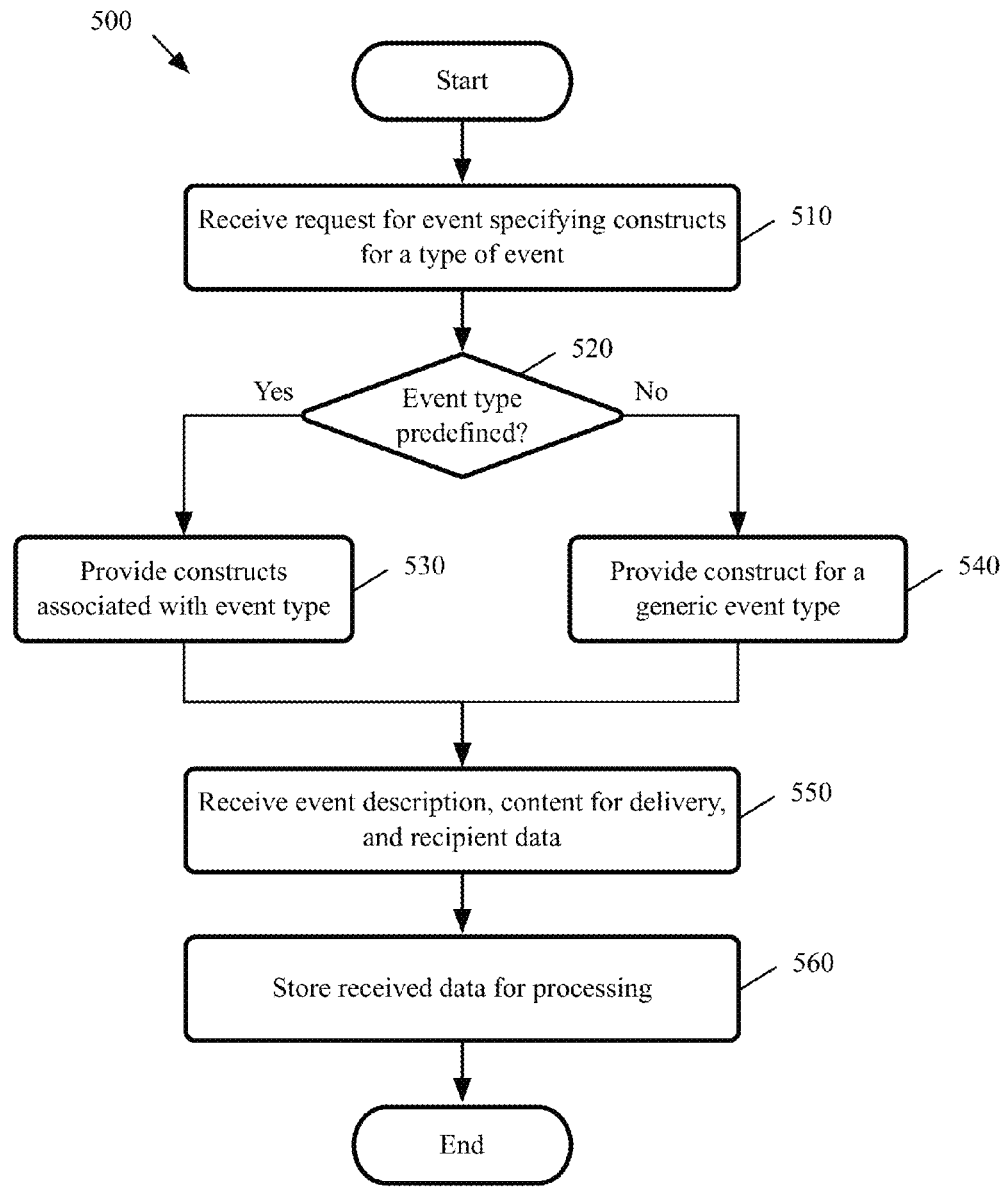
FIG. 5 conceptually illustrates a process of some embodiments for receiving a set of event configuration data.

FIG. 5 conceptually illustrates a process 500 of some embodiments for receiving a set of event configuration data. In some embodiments, the communication manager described above by reference to FIG. 4 performs the process 500. The process 500 of some embodiments implements a portion of a web application and/or web service that is provided by the future communication system of some embodiments.

The process 500 begins by receiving (at 510) a request from a user for event specifying constructs for a type of event. In some embodiments, the process 500 receives the request when a user is initially defining an event description. The user specifies input for the event specifying constructs in order to define an event that triggers the release of content when the event is detected.

Next, the process 500 determines (at 520) whether the type of event is predefined. As mentioned above, the event specifying constructs storage 450 stores event specifying definitions of different sets of event specifying constructs for different types of events. In some embodiments, the process 500 determines that the type of event is predefined when the process 500 identifies an event specifying definition for the type of event in the event specifying constructs storage 450. In such instances, the process 500 proceeds to 530. Otherwise, the process 500 determines that the type of event is not predefined and proceeds to 540.

At 530, the process 500 provides to the user the event specifying constructs defined for the type of event. In some embodiments, the process 500 (1) identifies the set of event specifying constructs specified in the identified event specifying definition for the type of event and (2) provides the input data fields to the user. The user uses the set of event specifying constructs to define an event of the type for which event specifying constructs were requested. After providing the event specifying constructs, the process 500 proceeds to 550.

At 540, the process 500 provides the user event specifying constructs for a generic event. In some embodiments, the generic event specifying constructs provide more flexibility and customization in terms of defining an event and/or an acceptable risk level assumed for false positive matches. In some embodiments, the event specifying constructs for the custom event include data fields for describing other data fields. For instance, when a user wishes to specify "Prince performing in San Jose" as an event for the content, the user may specify "Prince" in a first custom data field and "music artist" in a second custom data field that is defined to describe the first data field. This allows the user to distinguish the musical artist Prince from a prince in the royalty sense. Alternatively or in conjunction with using custom fields to describe other custom fields, some embodiments provide a feature that allows the user to specify input and descriptions for the input in a single data field. Some embodiments allow the user to upload a file (e.g., an extensible markup language (XML) file) that specifies custom event specifying constructs and values for those fields. Many additional and/or other techniques are possible for allowing the user to create custom-defined events for the content.

The process 500 then receives (at 550) the event description, the content for delivery, and recipient data (e.g., recipients of the content, information for authenticating recipients, etc.) from the user. In some embodiments, the process 500 receives the data for the set of event description data, the content, and the recipient data separately and/or at different times.

Finally, the process 500 stores (at 560) the received event description data, the content, and recipient data for processing. In some embodiments, the process 500 processes the data before storing the data. For instance, the process 500 of some embodiments performs normalization operations on the content and automatically transcodes the content into a particular format (e.g., a format commonly requested by users, a lossless format, a compressed format for reducing storage space, etc.). The process 500 may perform additional and/or other processing operations to the data in some embodiments.

In some embodiments, the front-end system provides a feature that allows users to select one or more integration applications in order to define an event for a content release. An integration application in some embodiments is an application developed by designers of the system or third party developers. The integration application is used for integrating with one or more data sources (e.g., Google® search, the Facebook® website, a news website, etc.). In some embodiments, the integration application serves as an interface to the data sources for which the application is developed and simplifies access to those data sources.

When a user selects a particular integration application, the user is prompted to provide parameters that specify the event condition rule sets under which an event is considered as detected. For example, a user might provide parameters for an integration application developed to access Google® search that specifies that the application must return five possible event matches (e.g., search results that is indicative of the occurrence of an event) to a specific search string for three consecutive days in order to constitute a detected event. By allowing the user to control when a content is released, the user can define complex and detailed events to trigger the release of content. In addition, a user may specify the event condition rule sets for a combination of multiple integration applications to define even more complex and detailed events upon which a content is released. As such, the integration application feature provides users a simpler and easier way to define different custom and/or complex events.

Third party developers and/or designers of the system may develop and add integration applications at any time to the system in order to expand the number of different data sources that the future communication system of some embodiments can access, thereby enabling the system to scale the different types of events that the system can handle. In addition, this feature relieves the system of the burden of handling complexly-defined events because, instead of processing the complex-defined events, the system merely passes input specified by the user to a specified integration application and allows the application to handle access to the data sources.

B. Event Configurator

Figure 6:
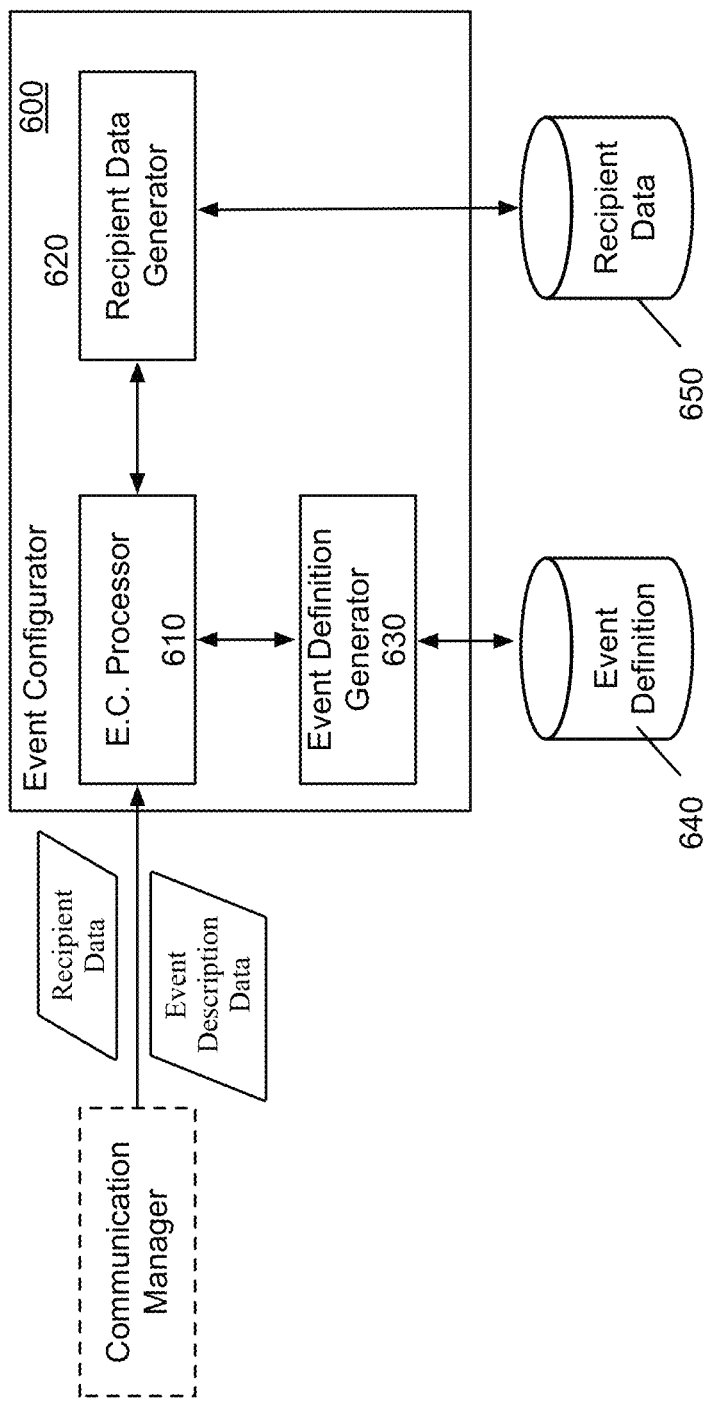
FIG. 6 conceptually illustrates a software architecture of an event configurator of some embodiments.

FIG. 6 conceptually illustrates the software architecture of an event configurator 600 of some embodiments. The event configurator 600 implements the event configurator described above by reference to FIG. 3, in some embodiments (i.e., event configurator 320). In some embodiments, the event configurator 600 is implemented by several servers that each implements one or more components of the event configurator 600. The event configurator 600 of some embodiments is implemented by a single server. As indicated above, the event configurator of some embodiments receives an event description from a user and generates an event definition from the event description by processing and analyzing the data received.

As shown, the event configurator 600 includes an event configurator processor 610, a recipient data generator 620, and an event definition generator 630. In addition, the event configurator 600 includes or utilizes data from an event definition storage 640 and a recipient data storage 650.

The event definition storage 640 and the recipient data storage 650 are similar to the corresponding data storages described above by reference to FIG. 3. That is, the event definition storage 640 stores information about events, which includes data from event descriptions specified by the creators of the events as well as, in some cases, additional information generated by the event configurator 600 to define the events. In some embodiments, for a particular event, this information may include event condition rule sets for detecting the event, data sources to use in detecting the event, data sources not to use in detecting the event, information for validating the event, etc. In some embodiments, event definition storage also stores conditions that are used for detecting events that trigger the release of content to designated recipients.

The recipient data storage 650 includes information about the recipients of the content upon detection of the various events defined in the event definition storage 640. In some embodiments, this information includes a list of recipients to which content will be released upon detection of each different event, as well as information for authenticating the recipients. For each recipient, some embodiments store a recipient identifier (e.g., a name, a unique ID, etc.), recipient contact information (e.g., where the content should be delivered, such as an e-mail address, etc.), authentication rules and/or authentication ID, and the mechanism(s) by which to deliver content to the recipient. In some embodiments, the storages 640 and 650 are stored in one physical storage while, in other embodiments, the storages are stored on separate physical storages.

The event configurator processor 610 handles the receipt of event description data and recipient information at the event configurator, and passes this information to the recipient data generator 620 and the event definition generator 630 for additional processing. In some embodiments, the event configurator processor 610 receives this information from the communication manager. The event configurator processor 610 may also retrieve the information from a storage in some embodiments. Upon receiving this information, the event configurator processor 610 identifies the recipient information and sends this information to the recipient data generator 620, while also identifying the user-provided event description data and sending this information to the event definition generator 630.

The recipient data generator 620 receives the recipient information provided by the user and generates storeable recipient data to send to the recipient data storage 650. In some embodiments, the recipient data generator 620 normalizes the recipient information into a defined format standard before storing it in the recipient data storage 650. The normalization may include conversion of data types (e.g., numerical data to textual data), removing certain white space, special characters, punctuation marks, etc., removing certain words, changing data formats, or other normalization operations. The recipient data generator stores the recipient data in a structured, normalized fashion.

The event definition generator 630 of some embodiments normalizes the event description data and generates an event definition based on the normalized event description data. In some embodiments, the event description received from the user and the stored event definition are the same, while in other embodiments the event definition generator modifies, removes, or appends data to generate the event definition.

As stated, the event definition generator 630 of some embodiments normalizes the event description data into a defined format standard. The normalization may include conversion of data types (e.g., numerical data to textual data), removing certain white space, special characters, punctuation marks, etc., removing certain words (e.g., articles, etc.) and/or characters, changing data formats (e.g., from "Month Day, Year" to "mm/dd/yyyy"), or other normalization operations.

The event definition generator 630 generates the event definition from the normalized data. In some embodiments, the event definition includes one or more event condition rule sets, conditions, validation rules, credibility rules, and data sources. The event definition generator 630 may also specifically exclude specific data sources, in some embodiments. The event conditions, in some embodiments, are conditions used to predict whether an event has occurred. When at least some of these conditions are met (i.e., satisfied or matched), the system detects the event, thereby initiating a process to release content to the recipients for the event.

The event condition rules are used to specify a search expression in some embodiments. This search expression may be directly specified by the user that creates the event, or may be derived from information provided by the user (e.g., if the user specifies that the event is the birth of a recipient's child, the event definition generator 630 may derive search phrases that typically indicate such an event).

Based on the nature of the data sources, the event definition generator 630 may generate different event condition rules for specific data sources. Many data sources provide access through APIs that require a particular set of parameters, often in a particular standard format. Thus, for a data source accessible via such an API, the event definition generator (when normalizing the event description data), generates conditions that conform to the format of the API's parameters, which allows the event scanning engine to use the event definition.

In some embodiments, the event definition generator 630 modifies and/or augments the event condition rules in order to provide better event detection. For instance, the event definition generator 630 in some embodiments adds synonymous search terms to the existing search terms (e.g., add "United States" to the search term "U.S." or "US"). In some embodiments, the event definition generator 630 replaces the existing search terms instead of adding to the existing search terms (e.g., to format a search term for a particular data source). The event definition generator 630 performs similar operations to API parameters, in some embodiments.

The event condition rules may be grouped into one or more event condition rule sets. In some embodiments, the event condition rules are grouped into sets based on data source, type of analysis performed (e.g., image analysis, textual analysis, etc.), condition met via the analysis, etc.

The validation rules of some embodiments are used to validate an event condition rule set that has been met (e.g., by validating the data sources used to determine that the condition was matched), while the credibility rules are used to determine the credibility of a satisfied condition (e.g., by assessing how credible a particular data source is that was used to match the condition).

The data sources, in some embodiments, include both data sources provided by the creator of the event as well as specific data sources auto-generated by the system. Some embodiments include a set of default data sources to use (unless specifically excluded) for any event, and some embodiments include specific data sources to use (unless specifically included) for particular types of events. Examples of data sources include a social security admin office (e.g., to query for a particular individual's death certificate), newspaper sources (e.g., to query for obituaries, engagement/wedding announcements, birth announcements, etc.), hospital records (e.g., to query for coroner's reports or birth records), Internet pages/sites, ancestry websites (e.g., to query ancestry via an API), social media websites to scan postings (e.g., on Facebook® Walls, Google® Plus Streams, etc. via permission granted), estate trustees/legal counsel (via permission granted), the Internal Revenue Service (IRS) records (via permission granted); credit card companies (via permission granted).

In some embodiments, the data sources generated by the event definition generator 630 is a list of data sources for the particular event. For a particular data source, the event definition stores a reference to further information about the data source which can be reused by definitions for multiple different events (e.g., numerous events might reference the same newspaper sources). The data source information may include data source location information (e.g., a website uniform resource locator (URL), an Internet Protocol (IP) address, a Media Access Control (MAC) address, etc.) and data source access information (e.g., an application programming interface (API), a database connection string, a user-name and password, etc.) that enables the system to access data in the particular data source.

Figure 7:
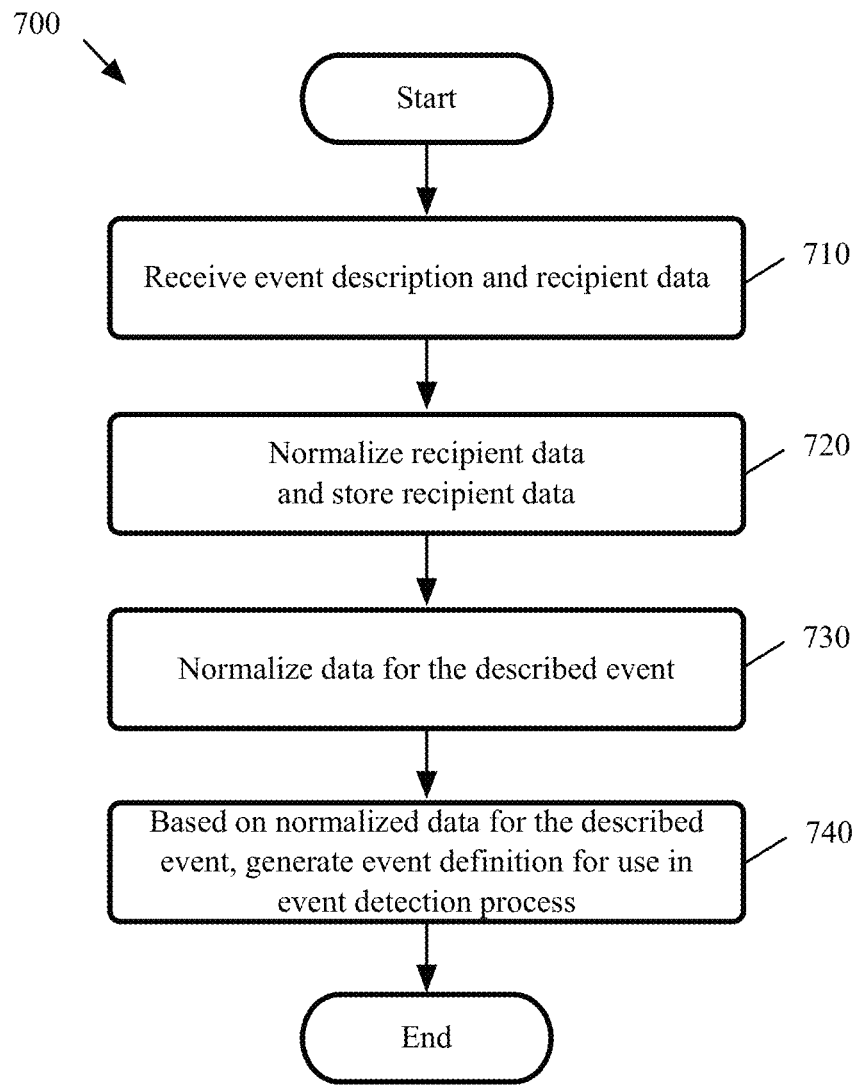
FIG. 7 conceptually illustrates a process of some embodiments for generating an event definition that is used for detecting an event.

An example operation of the event configurator 600 will now be described. Specifically, the operation will be described by reference to FIG. 7, which conceptually illustrates a process 700 of some embodiments for generating an event definition that is used for detecting an event. In some embodiments, the event configurator described above by reference to FIG. 3 performs the process 700 to generate event data.

As shown, the process 700 begins by receiving (at 710) event description and recipient data. In the event configurator 600, the event configuration processor 610 handles the receipt of this data (e.g., from the communication manager). In other embodiments, the event configuration processor 610 retrieves the information from a storage (e.g., a volatile memory or non-volatile storage into which the communication manager stored the information).

Next, the process 700 normalizes and stores (at 720) the recipient data. In some embodiments, the recipient data generator 620 normalizes the recipient information into a defined format standard before storing it in the recipient data storage 650. The normalization may include conversion of data types (e.g., numerical data to textual data), removing certain white space, special characters, punctuation marks, etc., removing certain words, changing data formats, or other normalization operations. The recipient data generator stores the recipient data in a structured, normalized fashion.

In some embodiments, the stored information for the event includes a list of recipients to which content will be released upon detection of the event, as well as information for authenticating the recipients. For each recipient, some embodiments store a recipient identifier (e.g., a name, a unique ID, etc.), recipient contact information (e.g., where the content should be delivered, such as an e-mail address, etc.), authentication rules and/or authentication ID, and the mechanism(s) by which to deliver content to the recipient.

The process 700 then normalizes data for the described event into a defined format standard. Some embodiments may only normalize some of the data (e.g., because the format may not matter for some data, or because the format is already correct as received in the event description), while other embodiments normalize all of the data. The normalization may include conversion of data types (e.g., numerical data to textual data), removing certain white space, special characters, punctuation marks, etc., removing certain words (e.g., articles, etc.) and/or characters, changing data formats (e.g., from "Month Day, Year" to "mm/dd/yyyy"), or other normalization operations. In some embodiments, the data is normalized for particular data sources to be searched.

Based on the normalized data for the described event, the process generates (at 740) an event definition for use in the event detection process. As described above, the event definition of some embodiments includes a group of event condition rule sets, conditions to be met, validation rules, credibility rules, and data sources.

The event condition rules, in some embodiments, are used to specify a search expression for searching one or more data sources. This search expression may be directly specified by the user in the event description or may be derived from information provided by the user (e.g., if the user specifies that the event is the death of a recipient's parent, the event definition generator 630 may derive search phrases indicative of such an event and tailored to different data sources). The search expressions may be simply strings of text to find in a data source, but may also include semantic text analysis (e.g., whether a first word set is found within a particular distance of a second word set, where a particular word set is found, etc.), image analysis (e.g., whether an image can be found that matches a reference image to at least a particular threshold), etc. The event condition rules of some embodiments are used to determine whether a condition has been met (i.e., satisfied or matched).

The validation rules of some embodiments are used to validate an event condition rule set that has been met (e.g., by validating the data sources used to determine that the condition was matched), while the credibility rules are used to determine the credibility of a satisfied condition (e.g., by assessing how credible a particular data source is that was used to match the condition).

In some embodiments, the generated event definition includes a list of data sources for the event. As indicated above, for a particular data source, the event definition stores a reference to further information about the data source which can be reused by definitions for multiple different events (e.g., numerous events might reference the same newspaper sources). In generating the list of data sources, the event definition generator 630 of some embodiments includes specified data sources to use for detecting the event as part and excludes any data sources specified for exclusion in the event description. Some embodiments include a set of default data sources to use (unless specifically excluded) for any event, and some embodiments include specific data sources to use (unless specifically included) for particular types of events. In some cases, the event description received from the user does not include any data sources, in which case the set of data sources will be entirely auto-generated. In some embodiments, however, the communication manager prevents the user from submitting an event description without any data sources.

The front-end system of some embodiments provides an integration application feature that allows users to select one or more integration applications in order to define an event. For example, in some such embodiments, when the user specifies an integration application to use for triggering the release of a content, the event configurator identifies the specified integration application (e.g., by accessing an integration application storage that stores integration applications) and generates event data that conforms to the format of the parameters that are used as input to the integration application.

Figure 8:
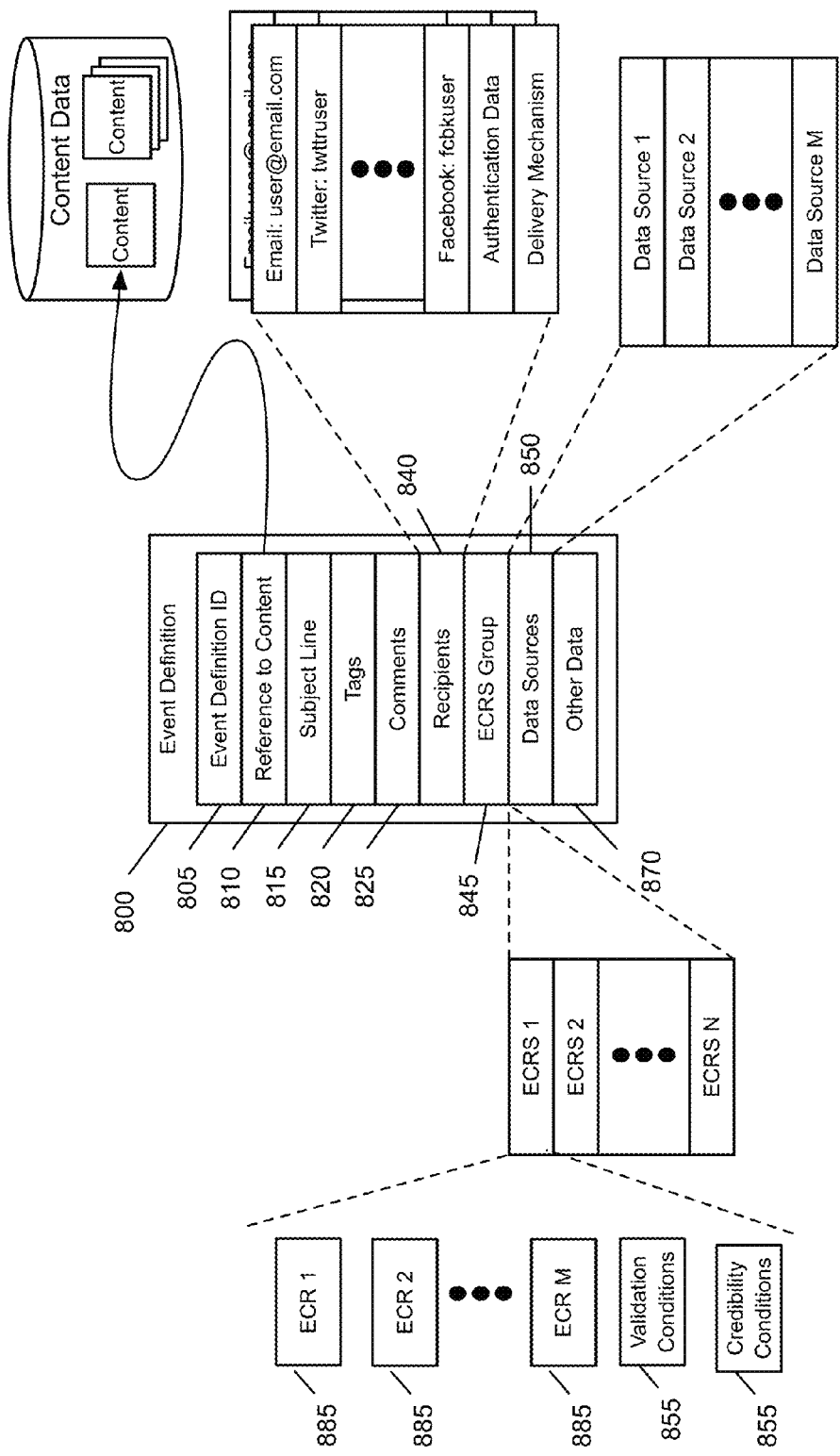
FIG. 8 conceptually illustrates a data structure for an event definition that is stored by the future communication system of some embodiments.

The description of several of the figures above discusses the processing of event description and related data and generating an event definition for an event. In some embodiments, the front-end system generates and stores a data structure to represent a defined event. FIG. 8 conceptually illustrates a data structure 800 for an event definition that is stored by the future communication system of some embodiments.

As shown, the data structure 800 includes an event definition ID 805, a reference to content 810, a subject line 815, tags 820, comments 825, recipients 840, a group of event condition rule sets 845, data sources 850, and other data 870. The event definition ID 805 is a unique identifier for the particular event.

The reference to content 810 is a pointer or other reference to the actual data (or a compressed/encoded version of the actual data) for displaying and/or playing the content (e.g., pixel and frame data for video content, sound data for audio content, pixel data for photo content, character data for text content, etc.). The reference to content 810 in FIG. 8 may refer to a single piece of content (e.g., a single video, text string, etc.), or may refer to multiple pieces of content for either separate delivery or delivery in a single package (e.g., for a many-to-one content release feature, which is described below), in some embodiments.

The content data of different embodiments are stored in different locations. For instance, the content data may be stored in a local location (e.g., stored as a file in a file system of a server on which the system runs). In such cases, the reference to content 810 refers to the local location. The content data of some embodiments is stored in another server (e.g., stored in a third-party cloud storage server). In some such embodiments, the reference to content 810 stores a reference to the content data stored in the other server.

Subject line 815 is information specified by the creator of the event (e.g., a user of the future communication system) or automatically generated by the system for the subject line of a communication delivering the content to a recipient. For instance, when the system releases content by emailing the content to a recipient, the information stored in subject line 815 is used for the subject line of the email.

Tags 820 store information specified by the creator of the event to associate with the content and/or communication delivering the content. For instance, the creator of the event, in some embodiments, might specify "wedding" and "brother" as tags for content that is to be released when the creator's brother gets married.

Comments 825 includes information related to the event's content. The information is specified in some embodiments by the creator of the event, contributors of content for the event (e.g., for a many-to-one content release feature), recipients of the content, or any other entity that accesses the content. The information may include remarks, comments, opinions, observations, etc.

The recipients 840 stores information for (or references to information for) one or more recipients specified by the creator of the event and the manner in which to contact each recipient (e.g., email address, Facebook account, Twitter account, phone number, etc.). Examples of recipients include an individual, a group of individuals, folders, public forums, websites, blogs, a public gallery or repository, data storage banks, newspaper publishers, non-profit organizations, for profit companies, governmental agencies, or any other type of entity that is capable of accessing the content once it is released. When the content is released based on a detection of the event, the system releases the content to each of the specified recipients. In addition, the recipient information includes authentication data and a mechanism for releasing the content (e.g., whether to deliver to one or all of the contacts for the recipient, a preference of which contacts to use, etc.).

The authentication information includes information specified by the creator of the event for authenticating the identity of the recipient. Examples of such information include a social security number, a driver's license number, the names of each of the recipient's parents, a maiden name, or any other type of information for uniquely identifying or verifying the identity of the recipient. In some embodiments, the authentication data also includes a username and/or password to use in order to login to a particular service in order to deliver the content.

The group of event condition rule sets 845 stores one or more event condition rule sets (or stores references to the event condition rule sets). As shown, each event condition rule set includes one or more event condition rules, as well as validation conditions and credibility conditions for the event condition rules. In some embodiments, each event condition rule or rule set specifies a search expression, or can be used to derive such an expression, enabling the system to search one or more data sources 850 for data that satisfies the expression. The system performs analysis on the data stored in the specified data sources in order to determine whether the data sources have data satisfying the event condition rule sets. In some embodiments, each event condition rule or event condition rule set is associated with a particular data source and is formatted particularly to that data source.

Each event condition rule set (or, in other embodiments, each event condition rule) includes validation conditions and credibility conditions. The validation conditions, in some embodiments, includes a validation level specified by the creator of the event that represents an extent to which an event condition rule or rule set must be matched in order to be validated or a risk level of false positive matches acceptable to the creator of the event. In some embodiments, each event condition rule set may have a low, medium, or high validation level. In some embodiments, a low validation level requires validation of the event from a reputable data source, a medium validation level requires additionally validation from the creator of the configured event, and a high validation level further requires validation from a third-party or a combination of parties (e.g., both a reputable data source and a third party). One of ordinary skill in the art will understand that aforementioned validation levels represent only one possible example. Any number of validation levels or permutations involving validation by the system, creator of the event, etc. are possible and each validation can have additional and/or different validation methods.

The credibility conditions, in some embodiments, specifies a threshold credibility for each matched and validated event condition rule or rule set. As described below, different data sources may have different credibility ratings in some embodiments, and the credibility conditions specify a threshold above which the data source credibility rating must lie in order for the data source to be considered credible.

The data sources 850 are specific data sources provided by the creator of the event or automatically generated by the system (e.g., based on the event type) that should be searched in order to detect an event. As shown, multiple data sources may be specified for a single event. In some embodiments, the data sources 850 are references (e.g., using a data source ID) to data source information stored elsewhere, so that a single data source data structure (which provides information on how to access the data source, etc.) may be referenced by several events.

The other data 870 stores any additional data that the future communication system of some embodiments might store with a event. This includes, for example, the type of event (e.g., birth, death, engagement, wedding, etc.), a flag for indicating that the event has been detected and the content released, etc.

One of ordinary skill in the art will recognize that the data structure 800 is only one possible data structure that the future communication system of some embodiments might use to store the required information for a communication. For example, different embodiments might store additional or less information, store the information in a different order, store some or all of the information in separate data structures reference through pointers, etc.

In addition, the data structure illustrated in FIG. 8 is a conceptualization of data attributes of an event definition and the organization of the data that represents the event definition and other data structures. Different embodiments use different methods to implement the data structure. For instance, in some embodiments, the data structure is implemented as an XML file. The data structure of some embodiments is implemented in a database (e.g., a relational database). Many other methods for implementing the data structure are possible.

C. Example Events

As discussed above, in some embodiments, the event specifying construct provider provides different sets of event specifying constructs for different types of events so that the future communication system is able to effectively detect the occurrence of different types of events. In addition, the event configurator of some embodiments identifies different sets of data sources for different types of events. This section will describe several example types of events, an example set of event specifying constructs for each type of event, and an example set of data sources for each type of event that may be specified by a user or the system of some embodiments.

For a content that is defined to be released upon an individual's death, the event specifying construct provider of some embodiments provides the following event specifying constructs: the name of the individual, the date of birth of the individual, the social security number of the individual, family members' information of the individual, an address that was previously associated with the individual or an address that is registered to the individual via property tax filings to a deceased party, the name of individual's spouse, and other event specifying constructs that may be required for validation (e.g., navy rank, company name, former name, nickname, etc.).

An example set of data sources for detecting the individual's death includes the following data sources: social security administration office to query for the individual's name, social security number and associated references to the individual's death or death certificate, newspaper sources to query obituaries, hospital records to query for death certificate or coroner's reports, Internet pages/sites, social media websites to scan postings (e.g., on Facebook® Walls, Google® Plus Streams, etc. via permission granted by the individual), estate trustees, legal counsel, the Internal Revenue Service (IRS) records (via permission granted by the individual); and credit card companies (via permission granted by the individual).

The next example type of event is a content that is defined to be released when an individual has a wedding (i.e., gets married). The event specifying construct provider of some embodiments provides the following event specifying constructs: the name of the individual, the date of birth of the individual, information regarding the individual's location, the individual's social security number, and an address that was previously associated with the individual or an address that is registered to the individual via property tax filings.

The following data sources are examples of data sources that are used for detecting the individual's marriage: county records to query for a marriage license, newspapers to query for engagement announcements, wedding registry websites, websites created by engaged couples, social media websites to scan postings (e.g., on Facebook® Walls, Google® Plus Streams, etc. via permission granted by the individual), registration databases (that are provided by the system in some embodiments) that allow wedding planners, photographers, caterers and cake makers to register their engaged client base.

Another type of event is a content that is defined to be released upon the election of the first female U.S. President. In some embodiments, the event specifying construct provider provides the following event specifying constructs: a set of triggering words and/or phrases (e.g., "election of first female U.S. president", "first female U.S. President elected", etc.) contained in a set of news sources (e.g. New York Times, Washington Post, Wall Street Journal, etc.) and electronic feeds provided by television news organizations. Examples of data sources that are used to detect the election of the first female U.S. President include the following: news sources, Internet blogs, etc.

For a content that is defined to be released when a baby is born to a specific individual's lineage, the event specifying construct provider of some embodiments provides the following event specifying constructs: name of individual from which ancestry is determined, the date of birth of the individual, the names of each of the individual's parents, and the individual's domicile.

An example set of data sources that are used for detecting the birth of a baby that belongs to an individual's lineage includes the following data sources: county, state, and/or hospital records to query for a birth certificate, social security administration records, various websites such as the ancestry.com website to query ancestry via an API, Internet/social media sites (e.g., the Facebook® website, the Google® Plus website, etc.), and news sources to query for birth announcements.

The next example type of event is a content that is defined to be released when an individual arrives at a particular geographical location. In some embodiments, the event specifying construct provider provides the following event specifying constructs: the name of the individual, the cell phone number of the individual, the latitude and longitude coordinates of the location at which to release the content, the name of the location, and the name of a business or residents at the location.

The following is an example of data sources that are used for detecting the individual's arrival at the specified geographical location: cell phone towers, satellite feeds, mobile carriers, social media websites to scan postings (e.g., on Facebook® Walls, Google® Plus Streams, etc. via permission granted by the individual), text messages sent to and received by the creator (via permission granted by the recipient), emails, integrated or third-party mobile applications operating on the individual's mobile device for querying the location of the mobile device (via permission granted by the individual).

Another type of event is a content that is defined to be released upon an action taken by an individual who is also the recipient of the content. An example for this type of event is a content that is defined to be released upon an individual announcing a job promotion. The event specifying construct provider of some embodiments provides the following event specifying constructs: the name of the individual and a set of triggering words and/or phrases (e.g., "promotion" or "promoted" in this example).

Example data sources for detecting the individual announcing a job promotion include the following: the Internet, social media websites to scan postings (e.g., on Facebook® Walls, Google® Plus Streams, etc. via permission granted by the individual), websites of newspapers, the PR newswire website, and text messages sent to and received by the individual (via permission granted by the individual).

For a content that is defined to be released upon the engagement of an individual, the event specifying construct provider of some embodiments provides the following event specifying constructs: the name of the individual, the social security number of the individual, an address that was previously associated with the individual or an address that is registered to the individual via property tax filings, and a set of triggering words and/or phrases (e.g., "I just got engaged", "engagement", etc.).

An example set of data sources that are used for detecting the engagement of the individual includes the following data sources: social media websites to scan postings (e.g., on Facebook® Walls, Google® Plus Streams, etc. via permission granted by the individual), newspapers websites to query for engagement announcement, wedding registry websites, websites created by engaged couples, and registration databases (that are provided by the system in some embodiments) that allow wedding planners, photographers, caterers and cake makers to register their engaged client base.

Yet another example type of event is a content that is defined to be released upon the sale, acquisition, or IPO of a company. In some embodiments, the event specifying construct provider provides the following event specifying constructs: the name of the company name appended to a set of triggering words or phrases (e.g., "IPO", "initial public offering", "S-1", "acquisition", "merger", etc.).

The following is an example of data sources that are used for detecting the sale, acquisition, IPO of a company: news sources, SEC records to query for SEC filings, Internet websites, and the PR Newswire website.

Lastly, an example type of event is a content that is defined to be released when two or more events occur simultaneously or sequentially. An example of such a type of event is a content that is defined to be released when (1) the San Francisco 49ers play the New York Giants in the Superbowl and (2) the 49ers win. In some embodiments, the event specifying construct provider provides the following event specifying constructs: the names of the two teams appended to a set of triggering words or phrases (e.g., "49ers win Superbowl", "49ers Superbowl champions", etc.). In order to be even more specific, the even specifying construct can include the names of the two teams appended to aforementioned triggering phrases along with a date match for a date & time in the future when compared to the creation date of the configured event.

An example set of data sources that are used for detecting that the 49ers play the New York Giants in the Superbowl and that the 49ers win include the following data sources: news sources, gambling sites, team press releases, and the Internet.

One of ordinary skill in the art will realize that the example types of events described above are only several of a countless number of different types of events. In addition, the event specifying constructs listed for each example is only one possible set of event specifying constructs that is provided to the creator of the configured event. For instance, additional and/or different event specifying constructs are provided to the creator of the configured event in some embodiments. Also, the data sources listed for each example is only one possible set of data sources that are used for detecting the event described in the example. In some embodiments, additional and/or different data sources are used for detecting the event.

III. Back-End System

The previous section describes various details of a front-end system that is included in the future communication system of some embodiments for processing contents and generating event condition rule sets for event detection operations. In some embodiments, the future communication system includes a back-end system for managing the detection and validation of events and the release of content to recipients when events are detected. The following section will describe various examples and embodiments of a back-end system that implements the event detection and validation and content release features of the future communication system of some embodiments.

A. Event Scanning Engine

Figure 9:
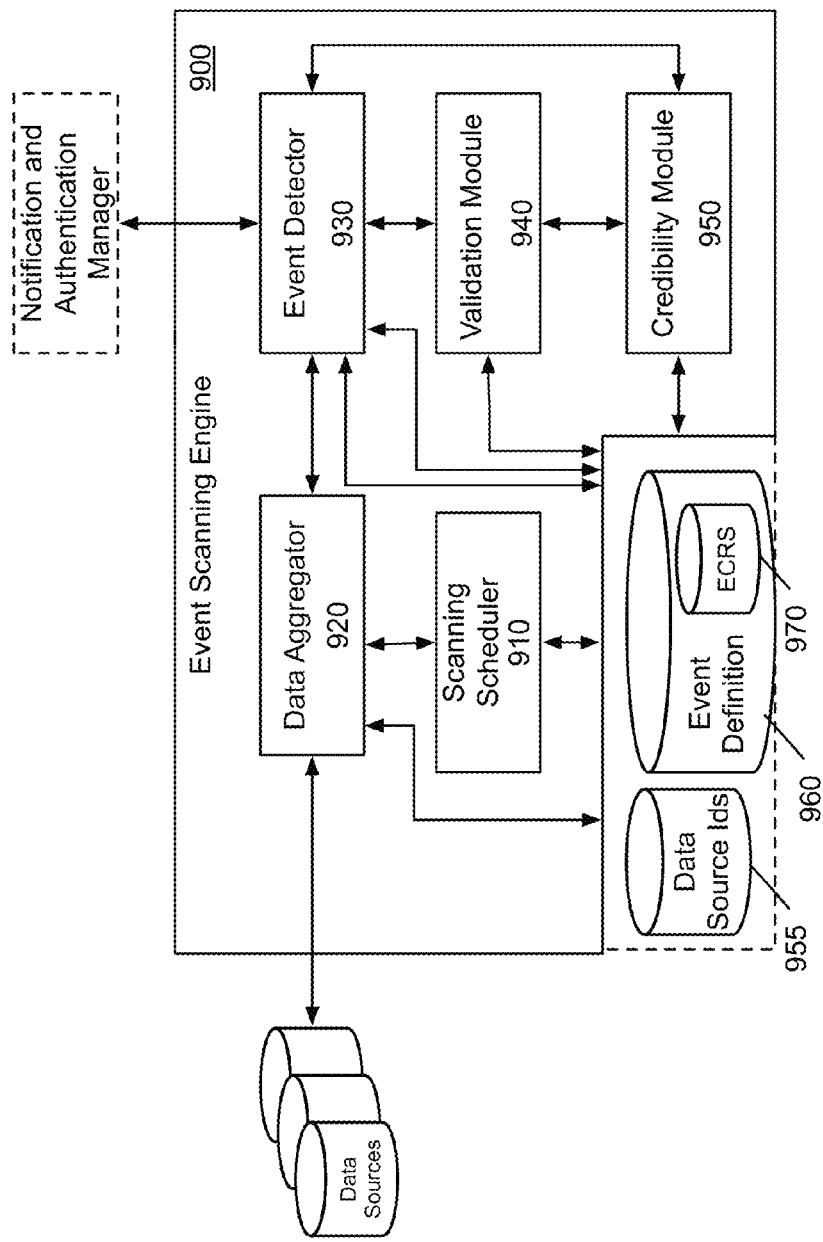
FIG. 9 conceptually illustrates a software architecture of an event scanning engine of some embodiments.

FIG. 9 conceptually illustrates a software architecture of an event scanning engine 900 of some embodiments. The event scanning engine 900 of some embodiments implements the event scanning engine described above by reference to FIG. 3. In some embodiments, the event scanning engine 900 is implemented by several servers that each implement one or more components of the event scanning engine 900.

As shown in FIG. 9, the event scanning engine 900 includes a scanning scheduler 910, a data aggregator 920, an event detector 930, a validation module 940, and a credibility module 950. Additionally, the event scanning engine 900 includes or utilizes a data source IDs storage 955 and an event definitions storage 960, which includes an event condition rule sets (ECRS') storage 970.

The data source IDs storage 955 and the event definitions storage 960 are similar to the corresponding storages described above by reference to FIG. 3. In other words, the data source IDs storage 955 stores unique data source IDs and the data source information to which the data source ID refers while the event definitions storage 960 stores event definitions (e.g., recipients to which content is released, data sources to use to detect events, information for validating events, information for authenticating recipients, etc., as described above by reference to FIG. 8). The ECRS' storage 970, which is part of event definition storage 960 in some embodiments, stores ECRS' that are used for detecting and validating events that trigger the release of content to designated recipients of the content. In some embodiments, the storages 955 and 960 are stored in one physical storage while, in some embodiments, the storages are stored on separate physical storages.

The scanning scheduler 910 is responsible for scheduling scans of data sources to detect events for releasing contents. The scanning scheduler 910 of some embodiments receives a notification that identifies an event (e.g., an event ID) from the event configurator after the event configurator has generated ECRS' for the event. In some embodiments, the scanning scheduler 910 uses occasion types, data source IDs, and user-provided scheduling instructions to schedule scans of data sources.

As noted above, the event scanning engine of some embodiments continuously scans the data sources to identify data that satisfies the conditions specified in ECRS'. In some such embodiments, the scanning scheduler 910 maintains a list of configured events for which scanning needs to be performed (i.e., the contents associated with the events have not been released) and schedules scanning operations for each event in the list. In some embodiments, the scanning scheduler 910 schedules scanning operations based on predicted detections of events, traffic load on data sources, and/or other priority criteria established by the system or the creators of the contents. When the scanning scheduler 910 receives the notification, the scanning scheduler 910 adds the notified content to the list. The scanning scheduler 910 of such embodiments repeatedly iterates through the configured events in the list and removes a particular event from the list when the event specified for the particular content is detected (and validated, if a validation is required).

In some embodiments, the scanning scheduler 910 continuously schedules event detection (i.e., the determination of whether an event has occurred) by simultaneously scheduling event detection for multiple configured events at once. The scanning scheduler 910 organizes the events into several groups such that the data sources that are accessed for the events in a particular group do not have any, or a minimum amount, of overlap. Organizing the contents in this fashion optimizes the number of data sources that can be accessed in parallel and decreases the amount of time waiting to access data sources.

As discussed above, in some embodiments, the event scanning engine performs event detection for triggering the release of a particular content or set of contents in response to a user's invocation of an on-demand scan. Alternatively, or conjunctively, the event scanning engine of some embodiments detects events for triggering the release of a particular content at a defined interval (e.g., thirty seconds, five minutes, an hour, a day, etc.). In addition, the event scanning engine of some such embodiments may perform event detection for different events at different defined scheduling intervals (e.g., determine whether a first event is detected once an hour and determine whether a second event is detected once a day). The scanning scheduler 910 of different embodiments uses different schemes to schedule the determination of whether events have occurred at the defined intervals.

Under one approach, the scanning scheduler 910 of some embodiments maintains different lists for different defined scheduling intervals. For example, in some such embodiments, the scanning scheduler 910 might maintain a list of configured events that are all scheduled for event detection once every ten minutes, a list of configured events that are all scheduled for event detection once an hour, etc. When the scanning scheduler 910 receives a notification for a particular configured event from the event configurator, the scanning scheduler 910 identifies the interval at which to schedule event detection for the content and adds the content to the list that corresponds to the identified interval (or creates one when no such list exists).

Using another approach, the scanning scheduler 910 of some embodiments maintains a single list of configured events for which event detection needs to be performed. In some embodiments, the scanning scheduler 910 associates with a configured event a time stamp that represents the time at which the event detection was scheduled for the event. For example, the scanning scheduler 910 in some embodiments stores the timestamp in a data structure that represents the content, such as the one described above by reference to FIG. 8. This way, when the scanning scheduler 910 iterates through each configured event in the list (continuously or at a defined interval, such as the shortest scheduling interval defined for a event), the scanning scheduler 910 examines the content's timestamp and schedules the event if the amount of time between the time of the timestamp and the current time is equal to or greater than the defined scheduling interval for the event.

With this approach, the scanning scheduler 910 in some embodiments has the flexibility to balance or spread more evenly the scanning operations over a given amount of time. As a simple example, if the event scanning engine 910 is handling event detection for forty-eight configured events and each event is defined to be scheduled once a day, the scanning scheduler 910 of some such embodiments has the flexibility to schedule one of the forty-eight events every half hour, which results in a relatively even load distribution throughout the day. In contrast, if the scanning scheduler 910 schedules all forty-eight events at or near the same time, the event scanning engine 900 experiences a large load for a short amount of time each day and then sits idle for the rest of the day. While several scheduling schemes are described above, one of ordinary skill in the art will realize that additional and/or different schemes may be used in some embodiments.

When the scanning scheduler 910 schedules a particular set of events, the scanning scheduler 910 identifies the ECRS' for each of the events by accessing the ECRS' storage 970 and identifies the data sources specified for detecting the configured event by accessing the event definitions storage 960. Then, the scanning scheduler 910 sends the information to the data aggregator 920 for accessing the data sources.

The data aggregator 920 is responsible for accessing data sources and retrieving data from the data sources. When the data aggregator 920 receives the ECRS' and data from data sources for detecting an event, the data aggregator 920 simultaneously and/or sequentially accesses each data source based on the corresponding ECRS' for the data source. As noted above, different data sources are accessed differently (e.g., different number of parameters, different parameter data formats, etc.). That is, each data source has its own protocol that is used to access the data source's data. For example, data sources may be accessible through APIs, database connections, integration applications, HTTP web page requests, rich site summary (RSS) feeds, etc.

The data aggregator 920 then receives or retrieves from the data sources (e.g., searches for) data that satisfy the ECRS' (or, in some embodiments, that satisfies conditions specified in the ECRS'). When the data aggregator 920 receives data back from the data sources, which is referred to as ECRS matches, the data aggregator 920 passes the data to the event detector 930. In some embodiments, a ECRS match is data that is indicative of the occurrence of an event that is being detected. That is, the data satisfies the ECRS' (or the conditions specified in one or more of the ECRS'). In some cases, the data aggregator 920 does not receive any data (or receives an empty set) back from any of the data sources in response to a search specified by an ECRS, which indicates that the ECRS has not been satisfied (and the event has likely not occurred).

The event detector 930 is responsible for detecting events. In some embodiments, the event detector 930 utilizes the validation module 940 and the credibility module 950 to detect the occurrence of events. When the event detector 930 receives the possible ECRS matches from the data aggregator 920, the event detector 930 of some embodiments passes the possible ECRS matches to the validation module 940 for validation, which in turn, passes validated ECRS matches to the credibility module 950 when the validation module 940 determines that the match of the ECRS is valid. When the validation module 940 determines that the match of the ECRS is not valid, the validation module 940 does not return any ECRS matches (or returns an empty set) to the event detector 930. In some embodiments, the event detector 930 receives from the credibility module 950 ECRS matches that are validated and determined to be credible.

In some instances, the event detector 930 may utilize only the validation module 940 to detect the occurrence of events. In such instances, the event detector 930 receives from the validation module 940 only validated ECRS matches while, in some embodiments, the event detector 930 receives from the validation module 940 validated ECRS matches and the remaining possible ECRS matches that could not be validated.

In other instances, the event detector 930 may utilize only the credibility module 950 to detect the occurrence of events. The event detector 930 in these instances receives from the credibility module 950 only those ECRS matches that are determined to be credible while, in some embodiments, the event detector 930 receives from the credibility module 950 ECRS matches that are determined to be credible as well as the remaining possible ECRS matches that were not determined to be credible.

Once the event detector 930 receives ECRS matches back from validation module 940 or the credibility module 950, the event detector 930 determines that the event has been adequately detected. However, in some embodiment, when the number of ECRS matches that the event detector 930 receives from the credibility module 950 does not pass a threshold number, the event detector 930 determines that the event is not credible, and, thus, the event has not been detected. In different embodiments, the threshold number is for all ECRS matches from all data sources or is for all ECRS matches from a specific data source(s).

When the event detector 930 does not receive any ECRS matches (or receives an empty set) back, the event detector 930 determines that the event has not occurred. The event detector 930 notifies the notification and authentication manager to initiate a process to trigger the release the content associated with the event (i.e., the content specified for release upon detection of the event) when the event detector 930 determines that the event has occurred. As will be described below, the process to release content includes authentication of the recipient(s) of the content in some embodiments.

However, some contents are defined to be released upon the occurrence of multiple events, and therefore the event detector 930 must detect each of the events in order for the content to be released. When the event detector 930 detects one of these events, the event detector 930 designates the event as detected (e.g., by storing information indicating its detection in the data structure that represents the event) in order to avoid performing event detection for the event again. The event detector 930 then checks whether the other events upon which the release of the content is predicated have been detected. When all of events for the content are detected, the event detector 930 notifies the notification and authentication manager to initiate the process to release the content.

The validation module 940 handles the validation of the possible ECRS matches that the validation module 940 receives from the event detector 930. When the validation module 940 determines that the event is validated, the validation module 940 passes the validated ECRS matches to the credibility module 950.

Different embodiments utilize any number of different techniques to validate the possible ECRS matches. For instance, the validation module 940 in some embodiments validates the possible ECRS matches by accessing a defined set of data sources (e.g., Google® search, Facebook® Wall, reputable and/or reliable news sources, etc.). If the validation module 940 receives ECRS matches from the set of data sources, then the validation module 940 determines that the possible ECRS matches are valid and, thus, validates the event. As another example, the validation module 940 might request validation from the creator of the event (e.g., via an email, a text message, a tweet, etc.) as a form of event validation. Additional and/or other validation methods are possible.

In addition, a creator of an event can specify the manner in which the event is validated, in some embodiments. For instance, as discussed above, a creator of the event can specify data sources for validating the ECRS matches. In some cases, the creator specifies data sources that are used for both event detection purposes and validation purposes. For instance, the creator might define an event that triggers the release of content upon the death of a particular individual and specify that the Social Security Administration's record database be used for purposes of detection and validation. Additional and/or other creator-specified ways to validate ECRS matches are possible. For instance, the creator of the content can specify multiple different validation methods that must be passed in order for the validation module 940 to determine that the event is validated. The creator can also specify a validation level (e.g., low, medium, high) for the content's events. For example, low, medium, and high validation levels represent in some embodiments the number of required validation methods (e.g., 1, 2, and 3) that must be successfully passed in order for the validation module 940 to determine that the event is validated.

The credibility module 950 analyzes the credibility of data sources that returned (1) validated ECRS matches, which are received from the validation module 940, or (2) possible ECRS matches, which are received from the event detector 930. In some embodiments, the credibility of a data source represents the trustworthiness of the results the data source returns (e.g., possible ECRS matches). The initial value (e.g., a weighted value between 0 and 1) of the credibility attribute of a data source is manually provided (e.g., by designers of event scanning engine) in some embodiments. In some embodiments, the value of the credibility attribute changes based on the following factors: the number of followers of the data source (e.g., for a particular social media feed, the number of readers of the data source, the current online clout (e.g., contemporary thought leaders) of the data source, a meme factor (e.g., current popularity on YouTube, etc.) of the data source, the degree of separation between the data source and the creator of the content or a recipient of the content, the level of common knowledge (e.g., the Wall Street Journal vs. a high school stock club newsletter) in content of the data source, the educational level (e.g., JD, MD, MBA, CPA, etc.) of the author of the ECRS match(es), the number of stories written by the author of the ECRS match(es), validation of ECRS match(es) in peer review journals or blind studies, the historical accuracy rate, etc. Additionally, a user may override the credibility attributes of data sources (e.g., by specifying a particular data source as more trustworthy than another data source, by specifying a value for the credibility attribute of a particular data source, etc.).

The credibility module 950 of some embodiments calculates a ranking score for each data source based on a credibility attribute of the data source. Based on the calculated ranking scores, the credibility module 950 of some such embodiments ranks the data sources (e.g., high to low). Finally, the credibility module 950 determines the ECRS matches derived from data sources that have a ranking score exceeding a defined threshold score value as credible and trustworthy. In some embodiments, the credibility module 950 sends the identified ECRS matches to the event detector 930.

As mentioned above, credibility is one of many factors used for ranking data sources in some embodiments. For instance, additional factors that are used for calculating ranking scores of data sources include user preference of particular data sources, historical data representing the rate of false positives (e.g., 50 day moving average of rate of false positives, 100 day moving average of rate of false positives, etc.), crowd-sourced values for credibility attributes of data sources, the currency of the data in the data source, the accuracy of the data source (e.g., based on the number of false positives), etc., Additional and/or other factors are used in some embodiments.

Figure 10:
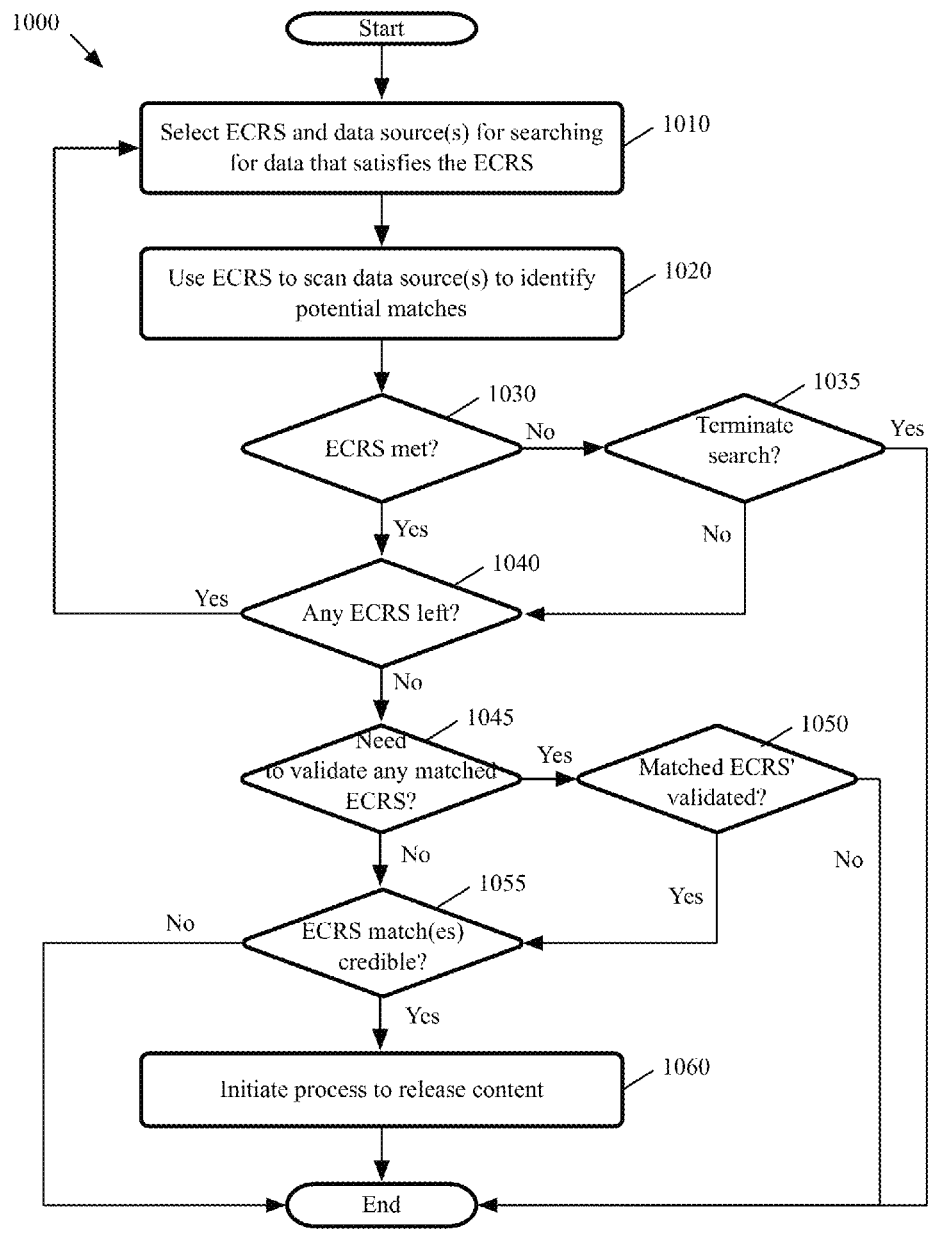
FIG. 10 conceptually illustrates a process of some embodiments for detecting an event defined by an event definition.

An example operation of the event scanning engine 900 will now be described. In particular, the example operation shown involves performing event detection operations for a single content. In some embodiments, the event scanning engine 900 performs event detection operations for contents in a sequential manner (even if contents are scheduled for the same time). Furthermore, the operation will be described by reference to FIG. 10, which conceptually illustrates a process 1000 of some embodiments for detecting a particular configured event.

The operation starts when event scanning engine 900 receives at the scanning scheduler 910 a notification that identifies a particular configured event from the event configurator after the event configurator has generated ECRS' for the content. In response, the scanning scheduler 910 adds the event of the content to the list maintained by the scanning scheduler 910. For purposes of explanation of this example, the scanning scheduler 910 next schedules event detection of the event that was added to the list.

The process 1000 starts by selecting (at 1010) an ECRS from the group of ECRS' for the event and identifying data source(s) to search for data that satisfies the selected ECRS. In this example, the scanning scheduler 910 performs this operation by accessing the ECRS' storage 970 to select the ECRS and accessing the event definitions storage 960 and the data source IDs storage 955 to identify the data sources. The scanning scheduler 910 sends the information to the data aggregator 920 to access the data sources.

Next, the process 1000 uses (at 1020) the selected ECRS to scan the data sources of the event in order to identify potential ECRS matches for the event of the content. In some embodiments, the data aggregator 920 simultaneously accesses the data sources based on the corresponding ECRS for the data sources while, in some embodiments, the data aggregator 920 sequentially accesses each data source based on the corresponding ECRS for the data source. When the data aggregator 920 receives data back from the data sources, the data aggregator 920 passes the data to the event detector 930. In some embodiments, a ECRS match is data that satisfies the ECRS (or satisfies conditions specified by the ECRS).

The process 1000 then determines (at 1030) whether the selected ECRS is matched. In some embodiments, the process determines that an ECRS is matched when the search query specified by (or derived from) the ECRS returns a positive hit in the data source(s). That is, when a particular search term is found, a set of terms within a particular defined context of each other are found, a particular image is matched to within a particular threshold, etc., the ECRS is matched. When the ECRS is matched, the process 1000 proceeds to 1040, which will be described further below.

When the process 1000 determines that the ECRS is not met, the process 1000 determines (at 1035) whether to terminate the search for data. In some embodiments, the process 1000 determines whether to terminate the search based on scheduling instructions specified by the system. When the process 1000 determines (at 1035) that the search be terminated, the process ends. Otherwise, the process 1000 proceeds to 1040.

At 1040, the process 1000 determines whether there are additional ECRS' for the event left to evaluate. If so, the process 1000 loops back to 1010 to select another ECRS. Otherwise, the process 1000 determines (at 1045) whether the ECRS matches for the ECRS' need validation. In some embodiments, the process 100 determines that validations are needed when the corresponding ECRS' specify validation conditions. That is, when a ECRS includes validation conditions, the validation is needed. Otherwise, the validation is not needed for the ECRS.

When the process 1000 determines (at 1045) that the validation is not needed, the process 1000 proceeds to 1055, which will be described further below. When the process 1000 determines (at 1045) that the validation is needed, the process 1000 proceeds to 1050 to determine whether the ECRS matches for the ECRS' are validated. In this example operation, the validation module 940 performs the operation 1050. As explained above, different embodiments utilize any number of different techniques to validate the possible ECRS matches. When the validation module 940 determines that the ECRS matches are valid, the process 1000 proceeds to 1055. Otherwise, the process 1000 ends.

At 1055, the process 1000 determines whether the validated ECRS matches for the ECRS' are credible. In this example, the credibility module 950 performs the operation 1055. To determine whether the ECRS matches are credible, the credibility module 950 analyzes the credibility of data sources that returned validated ECRS matches received from the validation module 940 by calculating a ranking score for each data source based on the credibility attribute of the data source. Based on the calculated ranking scores, the credibility module 950 (1) ranks the data sources and (2) determines the ECRS matches derived from data sources that have a ranking score exceeding a defined threshold score value are credible and trustworthy. When the credibility module 950 determines that none of the ECRS matches are credible, the process 1000 ends. In some embodiments, the process also determines whether enough of the ECRS matches are both validated and credible, and ends if there are not enough validated/credible matches. When enough of the ECRS matches have passed all of the tests, the process 1000 continues to 1060.

At 1060, the process 1000 initiates a process to trigger the release of content for the event. In some embodiments, the process 1000 initiates this process to release content by sending a message to a notification and authentication manager (e.g., notification and authentication manager 340 described above by reference to FIG. 3) to process the release of the content associated with event to specified recipients of the content.

The specific operations of the process 1000 may not be performed in the exact order shown and described. The specific operations may not be performed in one continuous series of operations, and different specific operations may be performed in different embodiments. For instance, the operations 1010-1040 could be performed for all conditions specified for all ECRS' for the event in parallel, rather than going through a single ECRS at a time. Also, the operations 1010-1040 could be performed for one data source specified in some or all of ECRS'. One of the ordinary skill in the art will recognize may other different sequence of performing the operations of the process 1000 are possible.

Figure 11:
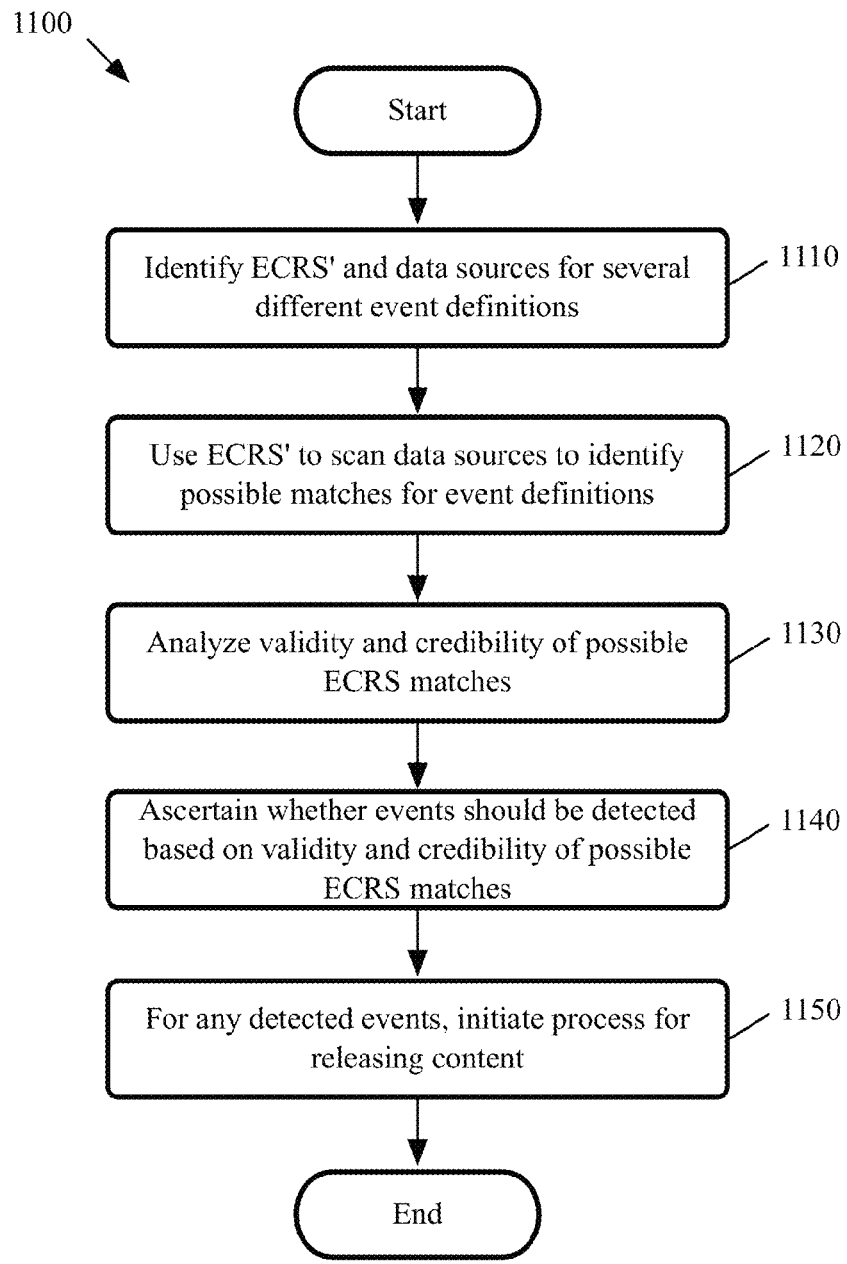
FIG. 11 conceptually illustrates a process of some embodiments for detecting multiple events defined by multiple event definitions.

As discussed above, the event scanning engine of some embodiments schedules multiple events for event detection at the same time. In some embodiments, the event scanning engine performs event detection for multiple events scheduled at the same time. FIG. 11 conceptually illustrates a process 1100 of some embodiments for detecting multiple events defined by multiple event definitions. In some embodiments, the event scanning described above by reference to FIG. 9 performs the process 1100 when the event scanning engine schedules event detection of events for multiple contents at once.

The process 1100 begins by identifying (at 1110) (1) ECRS' for several event definitions (i.e., configured events) and (2) data sources for the several different event definitions. In some embodiments, the process 1100 identifies the ECRS' by accessing a data storage that stores ECRS' for contents (e.g., the ECRS' storage 970 described above by reference to FIGS. 3, 6, and 9). Similarly, the process 1100 of some embodiments identifies the data sources by accessing a data storage that stores the event definitions of the events (e.g., the event definitions storage 960 described above by reference to FIGS. 3, 6, and 9).

Next, the process 1100 uses (at 1120) the ECRS' to scan the data sources to identify possible ECRS matches for events of the contents. In some embodiments, the process 1100 uses any of the methods described above to access data sources with ECRS'. The process 1100 simultaneously accesses the data sources based on the corresponding ECRS' for the data sources in some embodiments, while the process 1100 sequentially accesses each data source based on the corresponding ECRS' for the data source in some embodiments. After scanning the data sources, the process 1100 of some embodiments receives data (i.e., possible ECRS matches) from some or all of the accessed data sources. In some cases, the process 1100 does not receive any data (or receives an empty set) back from any of the data sources (i.e., does not have any search hits for the ECRS') for an event, which indicates that the event has likely not occurred.

The process 1100 then analyzes (at 1130) the validity and credibility of the identified possible ECRS matches. To analyze the validity of the identified possible ECRS matches, the process 1100 of some embodiments uses any number of the techniques described above by reference to FIGS. 9 and 10, or additional and/or other techniques as well.

In some embodiments, the process 1100 analyzes the credibility of the possible ECRS matches after the process 1100 analyzes the validity of the possible ECRS matches. Some such embodiments analyze the credibility of only the validated ECRS matches while other such embodiments analyze the credibility of all the possible ECRS matches.

To analyze the credibility of the possible ECRS matches, the process 1100 of some embodiments uses the ranking method described above by reference to FIGS. 9 and 10. That is, the process 1100 of such embodiments (1) calculates a ranking score for each data source based on the credibility attribute of the data source, (2) ranks the data sources based on the calculated ranking scores, and (3) determines the ECRS matches derived from data sources that have a ranking score exceeding a defined threshold score value are credible.

Next, the process 1100 ascertains (at 1140) whether the events are detected based on the validity and credibility of the possible ECRS matches. In some embodiments, the process 1100 identifies the possible ECRS matches that are determined as valid and credible according to the analysis and identifies events corresponding to the valid and credible ECRS matches as detected events (e.g., when enough of the ECRS' defined for the event are matched/valid/credible).

Finally, the process 1100 initiates (at 1150) process for releasing contents for any detected events. In some embodiments, the process 1100 initiates this process to release content by sending a message to a notification and authentication manager (e.g., notification and authentication manager 340 described above by reference to FIG. 3) to process the release of the content associated with event to specified recipients of the content.

B. Notification and Authentication Manager

Figure 12:
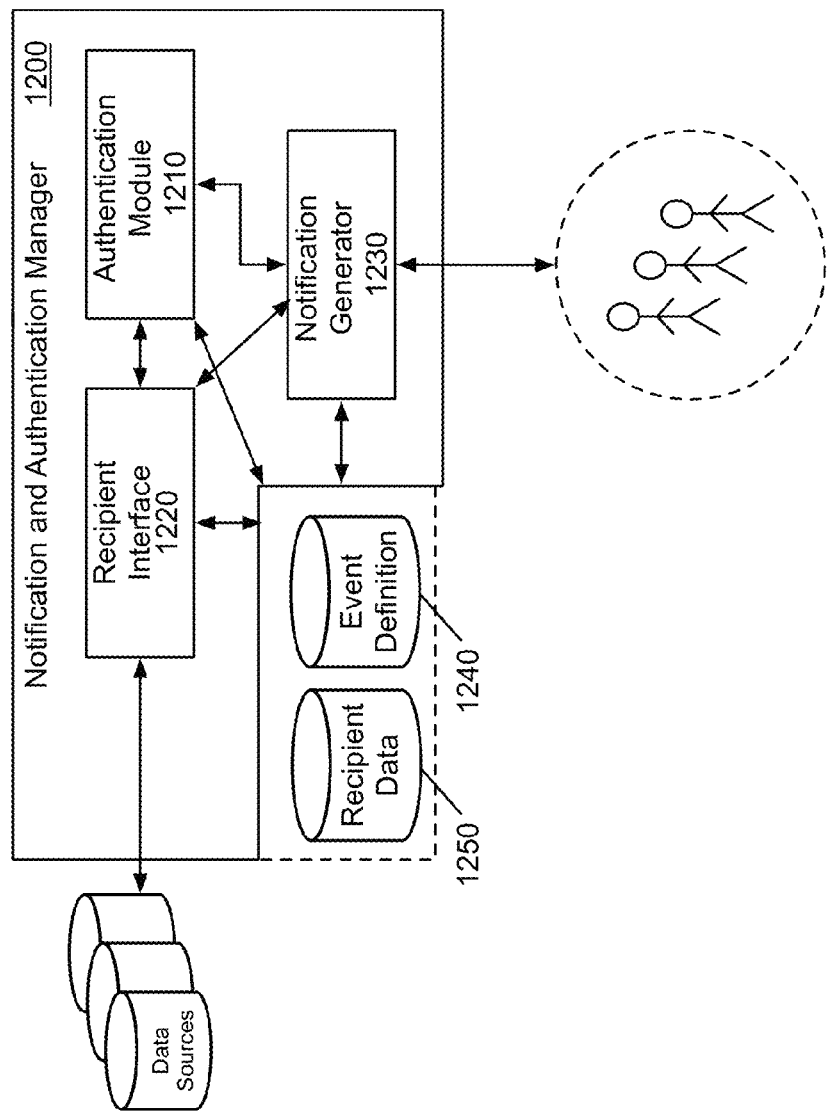
FIG. 12 conceptually illustrates a software architecture of a notification and authentication manager of some embodiments.

FIG. 12 conceptually illustrates a software architecture of a notification and authentication manager 1200 of some embodiments. In some embodiments, the notification and authentication manager 1200 implements the notification and authentication manager described above by reference to FIG. 3. The notification and authentication manager 1200 of some embodiments is implemented by several servers that each implement one or more components of the notification and authentication manager 1200. In some embodiments, the notification and authentication manager 1200 is implemented by a single server.

As shown, the notification and authentication manager 1200 includes an authentication module 1210, a recipient interface 1220, and a notification generator 1230. Additionally, the notification and authentication manager 1200 includes an event definition storage 1240 and a recipient data storage 1250. The event definition storage 1240 and the recipient data storage 1250 are similar to the corresponding data storages described above by reference to FIG. 3. That is, the event definition storage 1240 of some embodiments stores data generated by the event configurator (e.g., event configurator 320) for use by the event scanning engine (e.g., event scanning engine 330) to detect events that trigger the release of content to designated recipients of the content while the recipient data storage 1250 stores information about the recipients' of content (e.g., recipients IDs, recipient contact information, authentication rules and/or IDs, mechanisms for delivery content, etc.).

In some embodiments, the storages 1240 and 1250 are stored in one physical storage while, in some embodiments, the storages are stored on separate physical storages. Still, in some embodiments, the storages 1240 and 1250 are stored across several physical storages.

The authentication module 1210 is in charge of authenticating the identity of recipients of content before releasing the content to the recipients. When the authentication module 1210 receives a message from the event scanning engine to release content for a detected event to specified recipients of the content, the authentication module 1210 accesses the event definition storage 1240 to identify the event that was detected. Based on the identified event, the authentication module 1210 accesses the recipient data storage 1250 to identify (1) the specified recipients of the content for the detected event and (2) the recipients' contact information.

When the authentication module 1210 determines that contact information for a recipient is not valid (e.g., not available, outdated, incorrect, incomplete, etc.), the authentication module 1210 sends a request to the recipient interface 1220 to find valid contact information for the recipient. Upon receiving contact information for a candidate recipient from the recipient interface 1220, the authentication module 1210 passes the candidate recipient's contact information to the notification generator 1230 for authenticating the identity of the candidate recipient. A candidate recipient, in some embodiments, is an individual who could potentially be the actual intended recipient (e.g., the individual has the same or similar name as the actual intended recipient).

In some embodiments, instead of receiving a candidate recipient one at a time, the authentication module 1210 receives a group of candidate recipients from the recipient interface 1220. In such cases, the authentication module 1210 of some embodiments passes the contact information of all the candidate recipients to the notification generator 1230 for authenticating the identities of the candidate recipients.

If the authentication module 1210 receives a message from the notification generator 1230 indicating that authentication of the recipient's identity failed, the authentication module 1210 of some embodiments sends another request to the recipient interface 1220 to find valid contact information for the recipient. In some embodiments, the authentication module 1210 stops requesting the recipient interface 1220 to find valid contact information for the recipient after a defined number of failed authentications of candidate recipients. The authentication module 1210 of some embodiments continues to send requests to the recipient interface 1220 to find valid contact information for the recipient until valid contact information for the recipient is found and authenticated.

When the authentication module 1210 determines that contact information in the recipient storage 1250 for a recipient is valid, the authentication module 1210 passes the authentication information to the notification generator 1230 for authenticating the identity of the recipient. In some embodiments, the authentication module 1210 receives a message from the notification generator 1230 indicating that a recipient successfully authenticated the recipient's identity. In response to the message, the authentication module 1210 of some embodiments instructs the notification generator 1230 to release the content to the recipient. In some instances, the authentication module 1210 does not require authentication of recipients and just instructs the notification generator 1230 to release the content to the recipient.

The recipient interface 1220 is responsible for finding contact information for candidate recipients when contact information for a recipient of content is not valid. As noted above, a candidate recipient, in some embodiments, is an individual who could potentially be the actual intended recipient (e.g., the individual has the same or similar name). In some embodiments, the recipient interface 1220 receives requests from the authentication module 1210 to find valid contact information for a recipient. In different embodiments, the recipient interface 1220 utilizes any number of different ways to find valid contact information for recipients. For instance, the recipient interface 1220 of some embodiments finds candidate recipients by searching through a set of data sources, as shown in FIG. 12. Examples data sources include social networks (e.g., Facebook®, Linkedin®, Google® Plus, etc.), search engines, etc. Additional and/or different methods to find valid contact information for a recipient exist as well.

In some embodiments, the recipient interface 1220 provides a feature that allows an individual to contact the future communication system and check whether the system is holding any content that is ready for release to the individual as the system has detected its corresponding event. The system of some such embodiments (1) searches for content that could possibly be for the individual and (2) requests the individual to authenticate the identity of the individual before releasing any content to the individual.

The notification generator 1230 generates different types of notifications and delivers the notifications to the specified recipients of the notifications. For instance, when the notification generator 1230 receives (1) a message from the authentication module 1210 to authenticate the identify of a recipient along with (2) the recipient's contact information, the notification generator 1230 (1) accesses the recipient data storage 1250 to identify authentication information to request from the recipient, (2) generates a notification that requests such authentication information from the recipient, and (3) sends the notification to the recipient's contact information.

As noted above, authentication information in some embodiments is information that uniquely identifies or verifies the identity of the recipient (e.g., the recipient's social security number, driver's license number, the names of each of the recipient's parents, etc.).

When a recipient provides the notification generator 1230 with information in response to the authentication request, the notification generator 1230 (1) accesses the recipient data storage 1240 to identify the authentication information of the recipient and (2) compares the identified authentication information with the information provided by the recipient. If the information provided by the recipient matches the authentication information, the notification generator 1230 sends a message to the authentication module 1210 indicating that the recipient successfully authenticated the recipient's identity.

When the notification generator 1230 receives a message from the authentication module 1210 to release the content to a recipient, the notification generator 1230 (1) accesses the recipient data storage 1250 to identify the contact information (e.g., email address, a Facebook® account or username, a Twitter® username, a mobile number, etc.) of the recipient, (2) generates a notification indicating that content is released for the recipient and the content is available for the recipient to access, and (3) sends the notification to the recipient's contact information.

Figure 13:
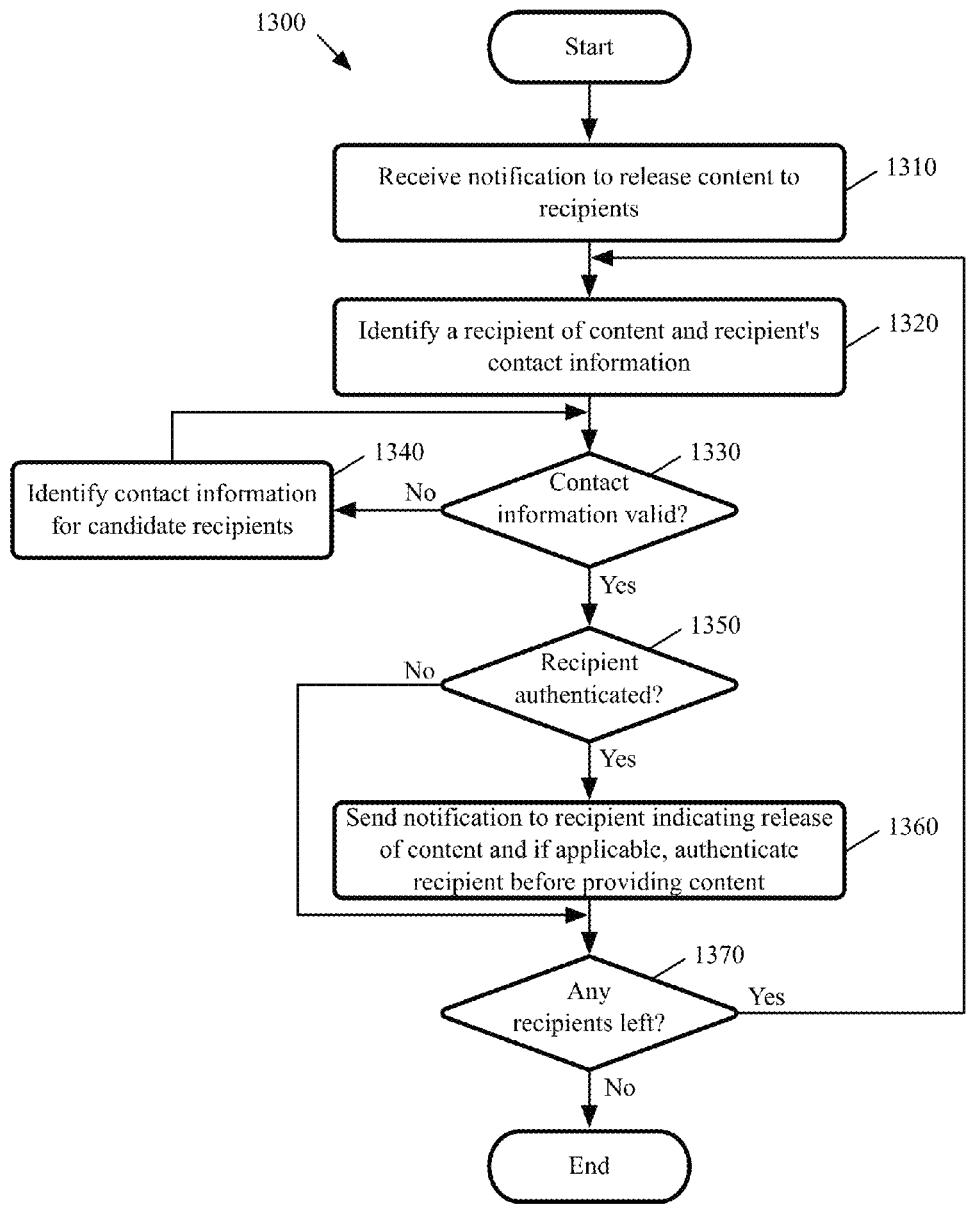
FIG. 13 conceptually illustrates a process of some embodiments for releasing content to a set of recipients.

An exemplary operation of the notification and authentication manager 1200 will now be described. In particular, the operation will be described by reference to FIG. 13, which conceptually illustrates a process 1300 of some embodiments for releasing content to a set of recipients.

The process 1300 begins by receiving (at 1310) a notification to release content for a detected event to specified recipients of the content. In this example, the authentication module 1210 receives the notification from the event scanning engine.

Next, the process 1300 identifies (at 1320) a recipient of the content and the recipient's contact information. The authentication module 1240 performs operation 1320 in this example. In some embodiments, the authentication module 1210 identifies the recipient and the recipient's contact information by accessing the event definition storage 1240 to identify the event that was detected, and accessing the recipient data storage 1250 based on the identified event in order to identify the recipient and the recipient's contact information.

The process 1300 then determines (at 1330) whether the contact information is valid. In some embodiments, the process 1300 employs many different techniques for different types of contact information when determining whether contact information is valid. For instance, if the contact information includes an email address, a Twitter® account, a Facebook® account, etc., the process 1300 determines that the contact information is valid if the contact information is live (e.g., successful delivery to an email address, a Twitter® account can be followed, Facebook® page is accessible, etc.). When the contact information is not live, then the process 1300 determines that the contact information is not valid. In addition, the process 1300 determines that the contact information is not valid when the contract information is not available (e.g., null value, empty string, etc.). Additional and/or other techniques are available to use as well.

When the process 1300 determines that the recipient's contact information is not valid, the process 1300 identifies (at 1340) contact information for candidate recipients. In this example, the recipient interface 1220 performs operation 1340. The recipient interface 1220 of different embodiments utilizes any number of different ways to find valid contact information for a recipient. For this example, the recipient interface 1220 searches through data sources, as described above, to identify contact information for candidate recipients. After identifying contact information for candidate recipients, the process 1300 returns to 1330 to determine whether the contact information for any of the candidate recipients is valid.

At 1350, the process 1300 determines whether the recipient is authenticated. The notification generator 1230 performs operation 1350 for this example. In some embodiments, the authentication module 1210 performs operation 1350. To send the recipient an authentication request, the notification generator 1230 (1) accesses the recipient data storage 1250 to identify authentication information to request from the recipient, (2) generates a notification that requests such authentication information from the recipient, and (3) sends the notification to the recipient's contact information. As noted above, authentication information in some embodiments is information that uniquely identifies or verifies the identity of the recipient (e.g., the recipient's social security number, driver's license number, the names of each of the recipient's parents, etc.).

When the recipient provides the notification generator 1230 with information in response to the authentication request, the notification generator 1230 (1) accesses the recipient data storage 1250 to identify the authentication information of the recipient and (2) compares the identified authentication information with the information provided by the recipient. If the information provided by the recipient matches the authentication information, the notification generator 1230 determines that the recipient is authenticate and continues to 1360. Otherwise, the notification generator 1230 determines that the recipient is not authenticated and the process 1300 proceeds to 1370.

Alternatively or in conjunction with the authentication method described above for operation 1350, notification generator 1230 of some embodiments authenticates the identity of the recipient using an auto-authentication feature. As such, the process 1300 in some such embodiments determines (at 1350) instead whether the recipient is authentication through the auto-authentication feature and/or the method described above for operation 1350.

Returning to FIG. 13 at 1360, the process 1300 sends a notification to the recipient indicating the release of the content to the recipient. In this example, the notification generator 1230 sends the notification by (1) accessing the recipient data storage 1250 to identify the contact information (e.g., email address, a Facebook® account or username, a Twitter® username, a mobile number, etc.) of the recipient, (2) generating a notification indicating that content is released to the recipient and the content is available for the recipient to access, and (3) sending the notification to the recipient's contact information. The process 1300 then continues to 1370. In some embodiments, the process 1300 requires a recipient to authenticate the identify of the recipient before the process 1300 provides the content to the recipient. For instance, the process 1300 of some embodiments requests a recipient to authenticate the identity of the recipient after the recipient clicks on a URL to access the content, but before allowing the recipient access to the content through the URL. One of ordinary skill will realize that in some embodiments or for some detected events (but not others) in some embodiments, the process 1300 does not perform the operation 1350 to authenticate the recipient before notifying the recipient of the content for release.

At 1370, the process 1300 determines whether any recipient of the content is left to process. The authentication module 1210 for this example performs operation 1370. When the authentication module 1300 determines that there is a recipient left to process, the process 1300 returns to 1320 to continue processing any remaining recipients of the content. Otherwise, the process 1300 ends.

IV. Other Types of Communications

Many of the examples and embodiments described above discuss contents (1) that are created by a single user and (2) that are defined to be released to a single recipient. This is also referred to as a one-to-one future content/messaging feature, which is provided by the future communication system of some embodiments. The following sections describe two other types of content distribution features that the future communication system of some embodiments supports. Section A will describe a many-to-one future content distribution feature and Section B will describe a one-to-many future content distribution feature. One of ordinary skill in the art will recognize a many-to-many future content distribution feature is also possible in some embodiments from reading the descriptions of the many-to-one and one-to-many features. Also, more generally an m-to-n future content distribution feature is possible where m and n are numbers greater than one. In addition, in some cases, m and n could be one, a few or many. Accordingly, all permutations of one, few, or many to many, few, or one are within the scope of some embodiments of the invention.

A. Many-to-one Content Distribution

Figure 14:
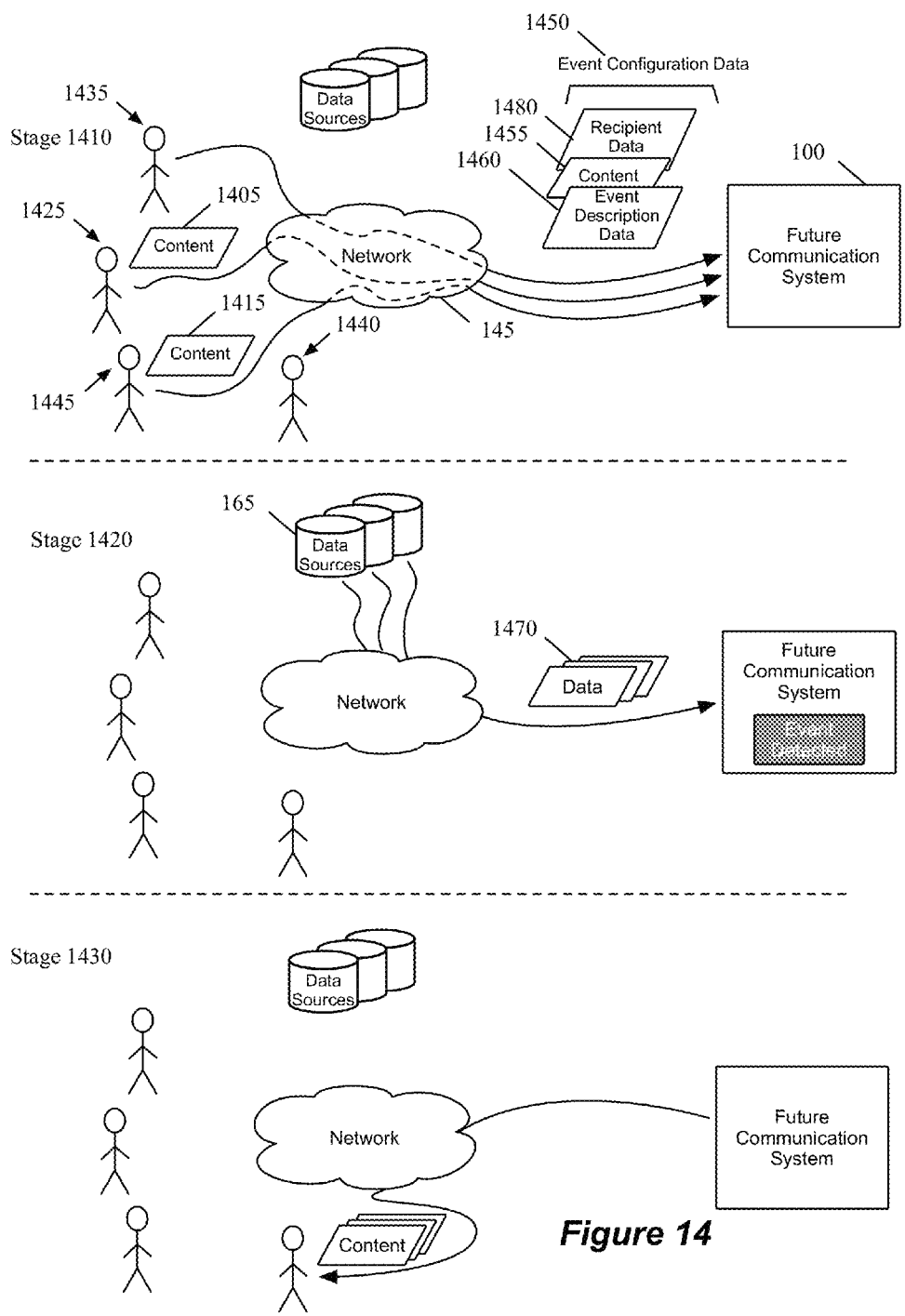
FIG. 14 conceptually illustrates a many-to-one content release feature of a future communication system according to some embodiments of the invention.

FIG. 14 conceptually illustrates a many-to-one content release feature of a future communication system according to some embodiments of the invention. Specifically, FIG. 14 illustrates the system 100 at three different stages 1410-1430 of a many-to-one future messaging operation according to some embodiments of the invention.

The first stage 1410 illustrates the future communication system 100 receiving a content from each of several users. As shown at this stage, the future communication system 100 is receiving a content 1455 from a user 1435 through a network 145. The content 1455 is similar to the content 155 described above by reference to FIG. 1. The event configuration data 1450 includes data that represents recipient data 1480, the content 1455, and event description data 1460 of an event. The first stage 1410 also shows the system 100 receiving content 1405 and 1415 from users 1425 and 1445, respectively.

In this example, the user 1435 has defined the event configuration data 1450 such that the contents 1455, 1405, and 1415 are to be released to user 1440 upon the occurrence of a future event that is specified by the event description data 1460.

The second stage 1420 illustrates the system 100 scanning a set of data sources 165 to detect the occurrence of the event defined by the event description data 1460. In the second stage 1420, the future communication system 100 is receiving data 1470 from the data sources 165 through the network 145. Based on the data 1470 gathered from the data sources 165, the system 100 has detected the occurrence of the event, as indicated in the future communication system 100 module.

The third stage 1430 illustrates the release of the contents 1455, 1405, and 1415 to the specified recipient of the content. In particular, the third stage 1430 shows the future communication system 100 releasing the contents 1455, 1405, and 1415 to the user 1440.

Figure 15:
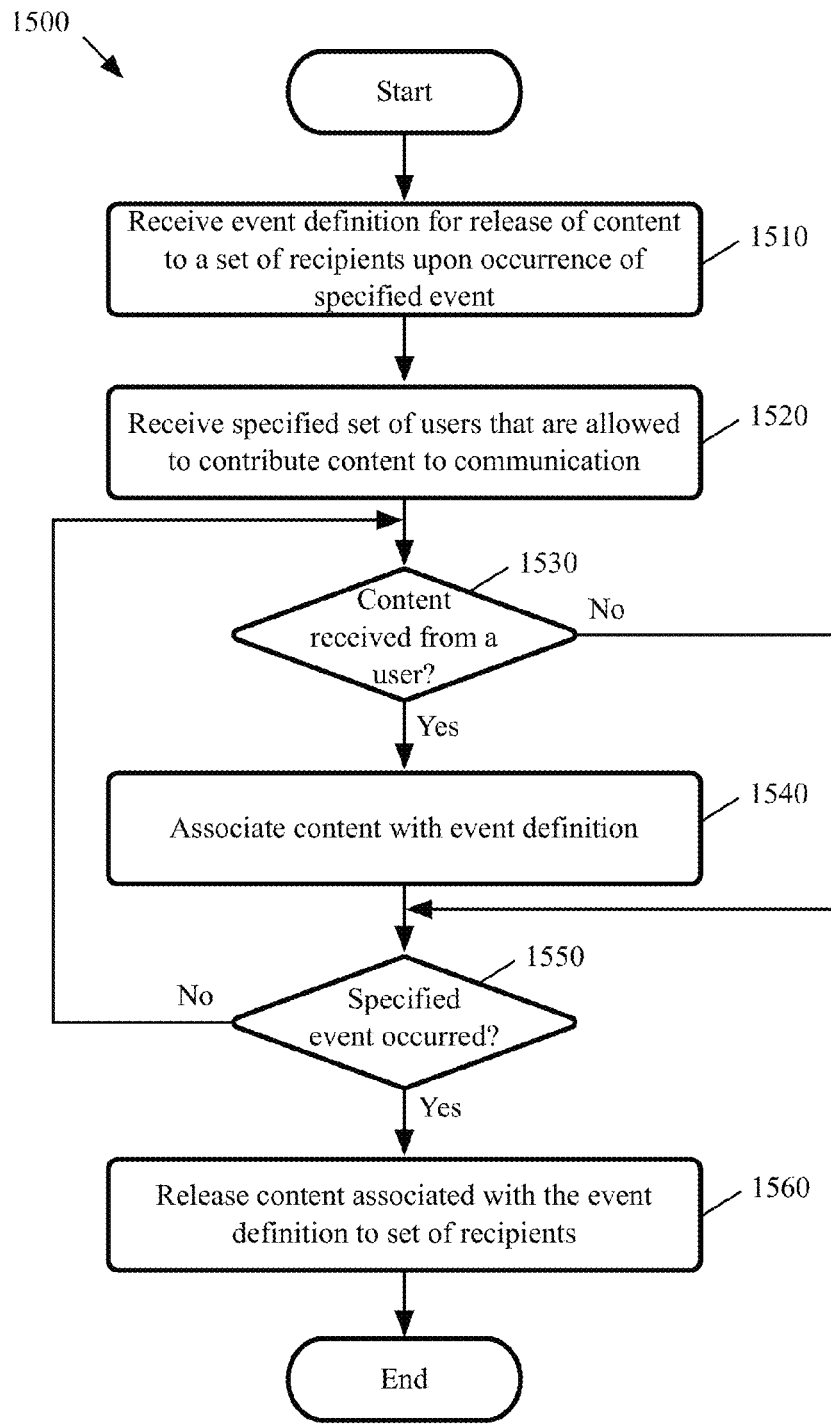
FIG. 15 conceptually illustrates a process of some embodiments for processing a many-to-one future communication.

FIG. 15 conceptually illustrates a process 1500 of some embodiments for processing a many-to-one future content release. In some embodiments, any of the future communication systems described above performs the process 1500 when processing a many-to-one future content release.

The process starts by receiving (at 1510) a definition of a content that is for release to a set of recipients upon the occurrence of a specified event. The process of some embodiments performs the process described above by reference to FIG. 5 as part of the receiving the request to create a content.

Next, the process 1500 receives (at 1520) a specified set of users that are allowed to contribute content to the content to be released. When the process 1500 receives the specified set of users, the process 1500 associates the specified set of users with the content (e.g., by storing names of a specified set of users in a data structure that represents the content). In some embodiments, the process 1500 receives the specified set of users that are allowed to contribute content to the content as part of the event definition that the process 1500 received at 1510. The many-to-one content release provides a multi-user and collaborative environment in which content is created.

The process 1500 then determines (at 1530) whether contributing content is received from a specified user. When the process 1500 determines that content is not received, the process 1500 proceeds to 1550. Otherwise, the process 1500 continues to 1540.

At 1540, the process 1500 associates the received content with the content to be released. This way, when the content is released, the specified recipient will receive all the content that has been received. In some embodiments, the process 1500 associates the received content with the content by adding a reference to the content in a data structure that represents the event.

Next, the process 1500 determines (at 1550) whether the specified event occurred. In some embodiments, the process 1500 performs the process described above by reference to FIG. 10 to determine whether the specified event occurred. When the process 1500 determines that the specified event has not occurred, the process 1500 returns to 1530 to check whether contributing content has been received from a user that is to be associated to the content to be released. When the process 1500 determines that the specified event occurred, the process 1500 releases (at 1560) the content associated with the content to the set of recipients. The process then ends.

B. One-to-Many Content Release

Figure 16:
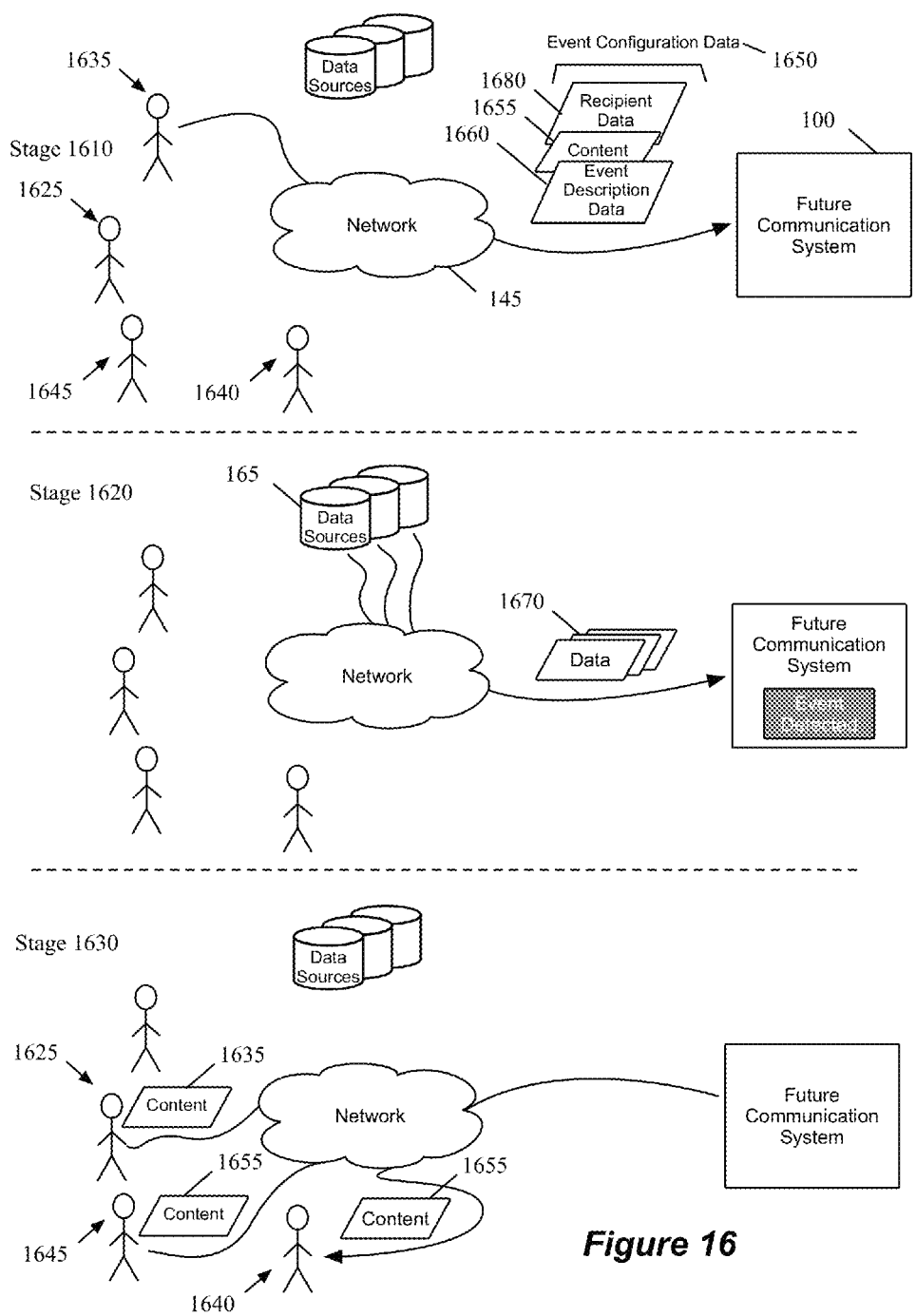
FIG. 16 conceptually illustrates a one-to-many content release feature of a future communication system according to some embodiments of the invention.

FIG. 16 conceptually illustrates a one-to-many content release feature of a future communication system according to some embodiments of the invention. In particular, FIG. 16 illustrates the system 100 at three different stages 1610-1630 of a one-to-many future messaging operation according to some embodiments of the invention.

The first stage 1610 shows the future communication system 100 receiving the event configuration data from a user. As shown at this stage, the future communication system 100 is receiving an event configuration data 1650 from a user 1635 through a network 145. The event configuration data 1650 is similar to the event configuration data 150 described above by reference to FIG. 1. The event configuration data 1650 includes data that represents recipients data 1680, content 1655, and event description data 1660 of an event. In this example, the user 1635 has defined the event configuration data 1650 such that the content 1655 is to be released to users 1625, 1645, and 1640 upon the occurrence of a future event that is specified by the event conditions 1660.

The second stage 1620 illustrates the system 100 scanning a set of data sources 165 to detect the occurrence of the event defined by the event description data 1660. In the second stage 1620, the future communication system 100 is receiving data 1670 from the data sources 165 through the network 145. Based on the data 1670 gathered from the data sources 165, the system 100 has detected the occurrence of the event, as indicated in the future communication system 100 module.

The third stage 1630 illustrates the release of the event configuration data 1650's content 1655 to the specified recipient of the content. In particular, the third stage 1630 shows the future communication system 100 releasing the content 1655 to the users 1625, 1645, and 1640.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 17:
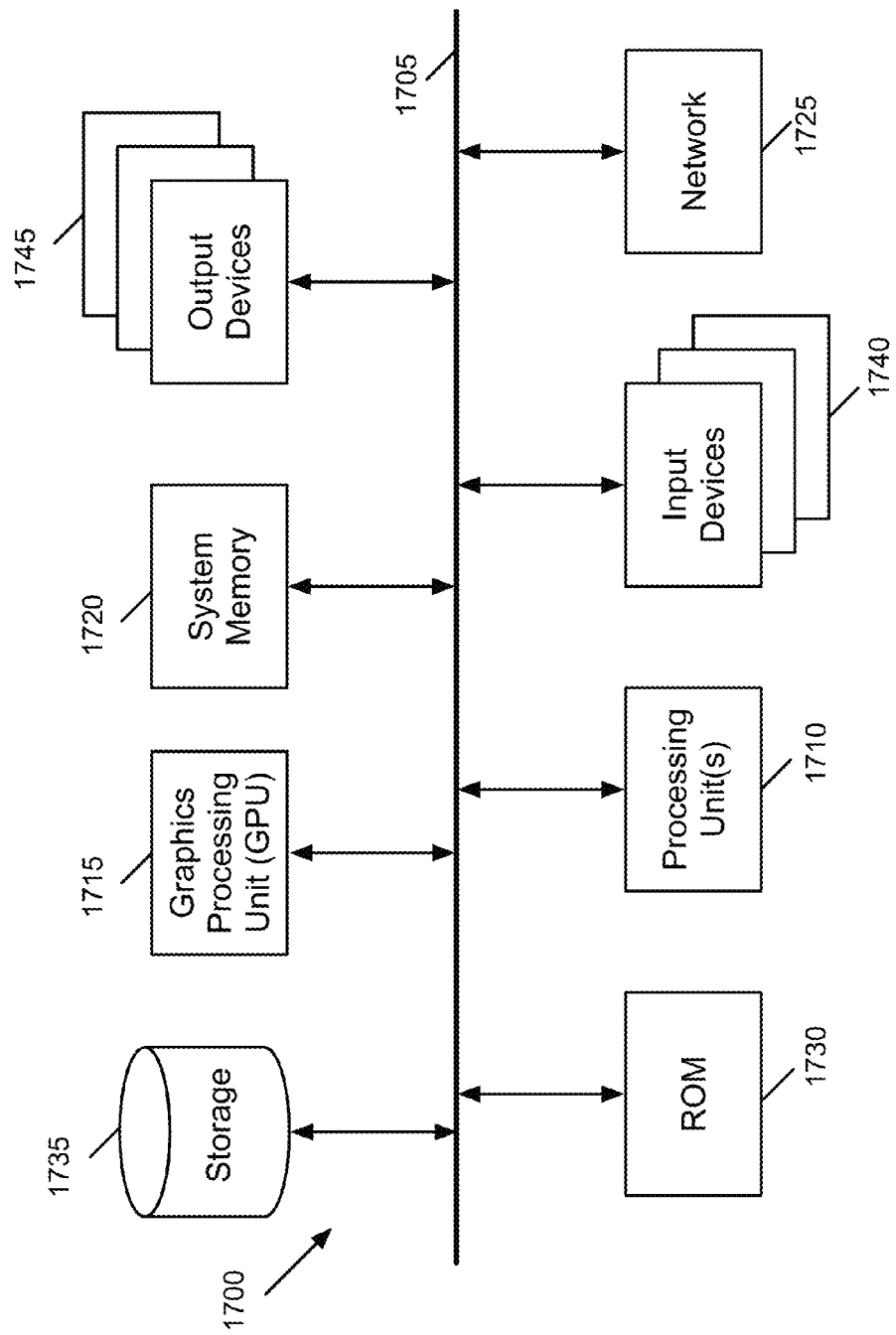
FIG. 17 conceptually illustrates an electronic system with which some embodiments of the invention are implemented.

FIG. 17 conceptually illustrates an electronic system 1700 with which some embodiments of the invention are implemented. The electronic system 1700 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1700 includes a bus 1705, processing unit(s) 1710, a graphics processing unit (GPU) 1715, a system memory 1720, a network 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the GPU 1715, the system memory 1720, and the permanent storage device 1735.

From these various memory units, the processing unit(s) 1710 retrieves instructions to execute and data to process in order to execute the processes of the invention. The processing unit(s) may be a single processor or a multi-core processor in different embodiments. Some instructions are passed to and executed by the GPU 1715. The GPU 1715 can offload various computations or complement the image processing provided by the processing unit(s) 1710.

The read-only-memory (ROM) 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive, integrated flash memory) as the permanent storage device 1735.

Other embodiments use a removable storage device (such as a floppy disk, flash memory device, etc., and its corresponding drive) as the permanent storage device. Like the permanent storage device 1735, the system memory 1720 is a read-and-write memory device. However, unlike storage device 1735, the system memory 1720 is a volatile read-and-write memory, such a random access memory. The system memory 1720 stores some of the instructions and data that the processor needs at runtime. In some embodiments, the invention's processes are stored in the system memory 1720, the permanent storage device 1735, and/or the read-only memory 1730. From these various memory units, the processing unit(s) 1710 retrieves instructions to execute and data to process in order to execute the processes of some embodiments.

The bus 1705 also connects to the input and output devices 1740 and 1745. The input devices 1740 enable the user to communicate information and select commands to the electronic system. The input devices 1740 include alphanumeric keyboards and pointing devices (also called "cursor control devices"), cameras (e.g., webcams), microphones or similar devices for receiving voice commands, etc. The output devices 1745 display images generated by the electronic system or otherwise output data. The output devices 1745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 17, bus 1705 also couples electronic system 1700 to a network 1725 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2, 5, 7, 10, 11, 13, and 15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A system comprising:
   an event configurator for:
      receiving (i) a description of an event and (ii) content for release upon detection of the event; and
      based on the received event description, generating an event definition comprising a group of one or more event condition rule sets (ECRS), each ECRS for use in specifying one or more searches for data from a group of data sources to determine whether the data indicates that a set of conditions associated with the ECRS has been met;
   an event detector for performing an automated process to analyze data searched from a set of data sources in order to detect the event based on the event definition; and
   a content control manager for releasing the content to a recipient upon detection of the event by the event detector, wherein the event detector detects the event associated with the event definition when a particular number of ECRS' of the group have a particular number of conditions that have been met.

2. The system of claim 1 further comprising:
   a notification manager for notifying the recipient that the content is available for release; and
   an authentication manager for authenticating the recipient before allowing the content control manager to deliver the content to the recipient.

3. The system of claim 1, wherein the content control manager is further for delivering the content to a plurality of recipients upon detection of the event by the event detector.

4. The system of claim 3,
   wherein the content comprises a plurality of pieces of presentation content supplied from a plurality of different entities, and
   wherein the event configurator is further for receiving different pieces of presentation content at different instances in time from different entities.

5. The system of claim 1,
   wherein the content comprises a plurality of pieces of presentation content supplied from a plurality of different entities, and
   wherein the event configurator is further for receiving different pieces of presentation content at different instances in time from different entities.

6. The system of claim 5,
   wherein the content control manager is further for delivering the content to a plurality of recipients upon detection of the event by the event detector, and
   wherein the number of recipients differs from the number of entities.

7. The system of claim 6, wherein the entities and recipients include individuals.

8. The system of claim 6, wherein the entities and recipients include organizations.

9. The system of claim 6, wherein the entities and recipients include individuals and organizations.

10. The system of claim 1 further comprising a recipient interface for allowing the recipient to login to the system to determine whether any content is ready for release to the recipient because the system has detected the content's associated event.

11. The system of claim 1, wherein the event description comprises a plurality of event condition rule sets.

12. A method comprising:
   receiving (i) a description of an event and (ii) content for release upon detection of the event;
   based on the received event description, generating an event definition comprising a group of one or more event condition rule sets (ECRS), each ECRS for use in specifying one or more searches for data from a group of data sources to determine whether the data indicates that a set of conditions associated with the ECRS has been met;
   storing (i) the content for possible future release to a recipient and (ii) the event definition;
   performing an automated process to analyze data searched from a set of data sources in order to detect the event based on the event definition; and
   releasing the content to a recipient upon detection of the event, wherein the event associated with the event definition is detected when a particular number of ECRS' of the group have a particular number of conditions that have been met.

13. The method of claim 12 further comprising:
   notifying the recipient that the content is available for release; and
   authenticating the recipient before allowing release of the content to the recipient.

14. The method of claim 12 further comprising delivering the content to a plurality of recipients upon detection of the event.

15. The method of claim 14, wherein the content comprises a plurality of pieces of presentation content supplied from a plurality of different entities, the method further comprising receiving different pieces of presentation content at different instances in time from different entities.

16. The method of claim 12 further comprising validating at least one satisfied ECRS to increase the accuracy of the event detection.

17. The method of claim 12 further comprising determining whether at least one satisfied ECRS is credible to increase the accuracy of the event detection.

18. The method of claim 12, wherein the event description comprises a plurality of event condition rule sets.

19. The method of claim 12,
wherein storing the content comprises storing the content in a network storage accessible through the Internet for possible future release to a recipient, and
wherein releasing the content comprises releasing the content to a recipient through the Internet upon detection of the event.

20. A method comprising:
receiving, for an event, (i) an event description comprising a plurality of event condition rule sets (ECRS) and (ii) content for delivery upon detection of the event;
based on the received event description, generating an event definition comprising group of one or more ECRS', each ECRS for use in specifying one or more searches for data from a group of data sources to determine whether the data indicates that a set of conditions associated with the ECRS has been met, wherein at least one ECRS of the event definition is generated (i) from the ECRS of the event description and (ii) by the method independent of the ECRS of the event description;
performing an automated process to analyze data searched from a set of data sources in order to detect the event based on the event definition; and
delivering the content to a recipient upon detection of the event by the event detector, wherein the event associated with the event definition is detected when a particular number of ECRS' of the group have a particular number of conditions that have been met.

21. The method of claim 20, wherein the detected event comprises a plurality of detected individual events.

22. The method of claim 21, wherein different events in the plurality of detected individual events may occur at different instances in time in the future.

* * * * *